United States Patent
Everton

(10) Patent No.: US 10,326,723 B2
(45) Date of Patent: *Jun. 18, 2019

(54) METHOD AND SYSTEM FOR DISAMBIGUATED EMAIL NOTIFICATIONS

(71) Applicant: eTorch Inc, Chicago, IL (US)

(72) Inventor: Paul Everton, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,806

(22) Filed: Dec. 21, 2017

(65) Prior Publication Data

US 2018/0115504 A1     Apr. 26, 2018

Related U.S. Application Data

(63) Continuation of application No. 15/378,259, filed on Dec. 14, 2016, now Pat. No. 9,860,202, which is a continuation of application No. 14/992,194, filed on Jan. 11, 2016, now Pat. No. 9,559,997.

(51) Int. Cl.
*G06F 15/16* (2006.01)
*H04L 12/58* (2006.01)
*H04L 29/08* (2006.01)

(52) U.S. Cl.
CPC ............ *H04L 51/12* (2013.01); *H04L 51/063* (2013.01); *H04L 51/08* (2013.01); *H04L 51/10* (2013.01); *H04L 67/02* (2013.01)

(58) Field of Classification Search
USPC ...................................................... 709/206
See application file for complete search history.

(56) References Cited

U.S. PATENT DOCUMENTS

| 5,771,355 | A  | * | 6/1998 | Kuzma | G06Q 10/107 709/226 |
| 5,781,901 | A  | * | 7/1998 | Kuzma | G06Q 10/107 |
| 5,903,723 | A  | * | 5/1999 | Beck  | G06F 17/22 707/999.01 |
| 6,275,850 | B1 | * | 8/2001 | Beyda | G06Q 10/107 358/402 |
| 6,505,237 | B2 | * | 1/2003 | Beyda | G06Q 10/107 370/352 |

(Continued)

OTHER PUBLICATIONS

Malamud, C., A No Soliciting Simple Mail Transfer Protocol (SMTP) Service Extension, Sep. 2004, IETF, RFC 3865, pp. 1-19.*

*Primary Examiner* — Alicia Baturay

(57) ABSTRACT

A system comprises email processing circuitry of a mail transfer agent. The email processing circuitry is configured to receive an inbound email message, and detect, based on parsing of the inbound email message, that the inbound email message is intended for multiple recipients and comprises one or both of: a header which determines that notification objects are to be embedded in corresponding output email messages; and body content which determines that notification objects to be embedded in the corresponding output email messages. The email processing circuitry is configured to generate a plurality of unique notification objects. The email processing circuitry is configured to, in response to the detection, package the inbound email message into the outbound email messages, wherein each of the outbound email messages is intended for only one of the multiple recipients and comprises a respective one of the notification objects.

18 Claims, 35 Drawing Sheets

(56) References Cited

U.S. PATENT DOCUMENTS

| | | | | |
|---|---|---|---|---|
| 6,618,747 B1* | 9/2003 | Flynn | G06Q 10/107 | 709/203 |
| 6,978,276 B2* | 12/2005 | Demsky | G06Q 10/107 | |
| 7,007,066 B1* | 2/2006 | Malik | G06Q 10/107 | 709/201 |
| 7,035,902 B1* | 4/2006 | Bates | G06Q 10/107 | 709/206 |
| 7,054,905 B1* | 5/2006 | Hanna | G06Q 10/107 | 709/206 |
| 7,092,993 B2* | 8/2006 | Goldberg | G06Q 10/107 | 370/465 |
| 7,113,948 B2* | 9/2006 | Jhingan | H04L 51/00 | |
| 7,146,402 B2* | 12/2006 | Kucherawy | H04L 51/12 | 709/206 |
| 7,257,639 B1* | 8/2007 | Li | H04L 51/22 | 709/206 |
| 7,305,430 B2* | 12/2007 | Choubey | G06Q 10/107 | 709/203 |
| 7,403,983 B2* | 7/2008 | Ueno | H04L 51/063 | 709/206 |
| 7,421,514 B2* | 9/2008 | Lee | G06Q 10/107 | 709/206 |
| 7,730,140 B2* | 6/2010 | Braun | H04L 51/28 | 709/206 |
| 7,831,669 B2* | 11/2010 | Braun | H04L 51/30 | 709/206 |
| 8,180,833 B2* | 5/2012 | Braun | G06Q 10/107 | 709/205 |
| 8,180,834 B2* | 5/2012 | Kay | H04L 51/12 | 709/203 |
| 8,209,222 B2* | 6/2012 | Esclamada | G06Q 10/107 | 705/14.4 |
| 8,407,292 B2* | 3/2013 | Grosu | H04L 51/066 | 709/201 |
| 8,458,269 B2* | 6/2013 | Friedman | G06Q 10/107 | 707/999.001 |
| 8,544,090 B1* | 9/2013 | Chen | G06F 11/00 | 713/154 |
| 8,826,432 B2* | 9/2014 | Dabbiere | H04L 63/0281 | 726/22 |
| 9,027,037 B2* | 5/2015 | Sato | G06F 13/14 | 709/224 |
| 9,137,185 B2* | 9/2015 | Costenaro | H04L 67/2857 | |
| 9,165,285 B2* | 10/2015 | Schultz | H04L 51/08 | |
| 9,203,650 B2* | 12/2015 | Malcolm | G06F 21/606 | |
| 9,203,849 B2* | 12/2015 | Hunt | H04L 63/1408 | |
| 9,559,997 B1* | 1/2017 | Everton | H04L 51/08 | |
| 9,860,202 B1* | 1/2018 | Everton | H04L 51/08 | |
| 2001/0054073 A1* | 12/2001 | Ruppert | G06Q 10/107 | 709/206 |
| 2002/0091538 A1* | 7/2002 | Schwartz | G06Q 30/02 | 705/329 |
| 2003/0014671 A1* | 1/2003 | Henson | G06F 21/602 | 726/5 |
| 2003/0115273 A1* | 6/2003 | Delia | G06Q 10/107 | 709/206 |
| 2005/0193075 A1* | 9/2005 | Haff | G06Q 10/107 | 709/206 |
| 2006/0031309 A1* | 2/2006 | Luoffo | G06Q 10/107 | 709/206 |
| 2006/0031352 A1* | 2/2006 | Marston | H04L 67/22 | 709/206 |
| 2006/0168012 A1* | 7/2006 | Rose | H04L 67/104 | 709/206 |
| 2007/0180035 A1* | 8/2007 | Liu | G06Q 10/107 | 709/206 |
| 2008/0028028 A1* | 1/2008 | Chismark | G06F 16/31 | 709/206 |
| 2008/0168146 A1* | 7/2008 | Fletcher | H04L 51/36 | 709/206 |
| 2008/0244021 A1* | 10/2008 | Fang | H04L 51/12 | 709/206 |
| 2009/0112995 A1* | 4/2009 | Addae | G06Q 10/107 | 709/206 |
| 2009/0313342 A1* | 12/2009 | Thie | G06Q 10/00 | 709/206 |
| 2010/0011077 A1* | 1/2010 | Shkolnikov | H04L 51/063 | 709/206 |
| 2011/0296003 A1* | 12/2011 | McCann | G06F 21/316 | 709/224 |
| 2012/0296988 A1* | 11/2012 | Rao | G06Q 10/107 | 709/206 |
| 2013/0205022 A1* | 8/2013 | Kagan | H04L 67/06 | 709/224 |
| 2015/0058429 A1* | 2/2015 | Liu | H04L 51/34 | 709/206 |
| 2017/0063764 A1* | 3/2017 | Lindley | G06F 16/214 | |

* cited by examiner

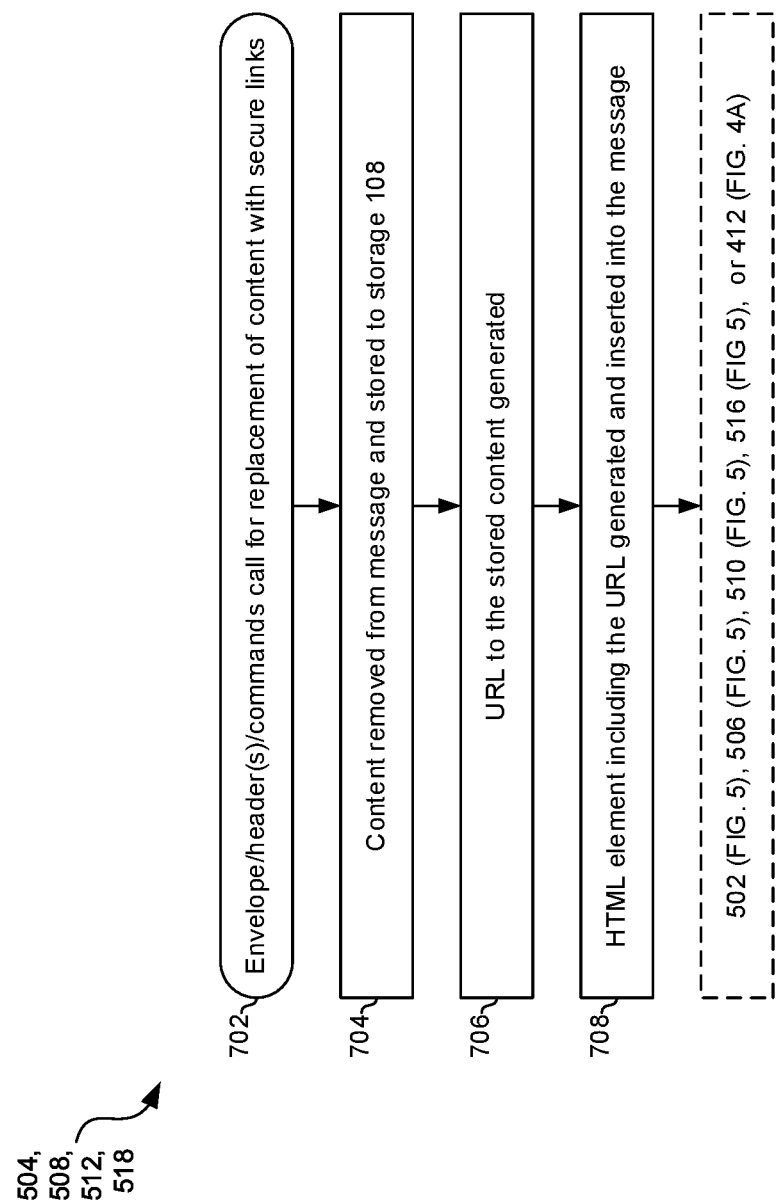

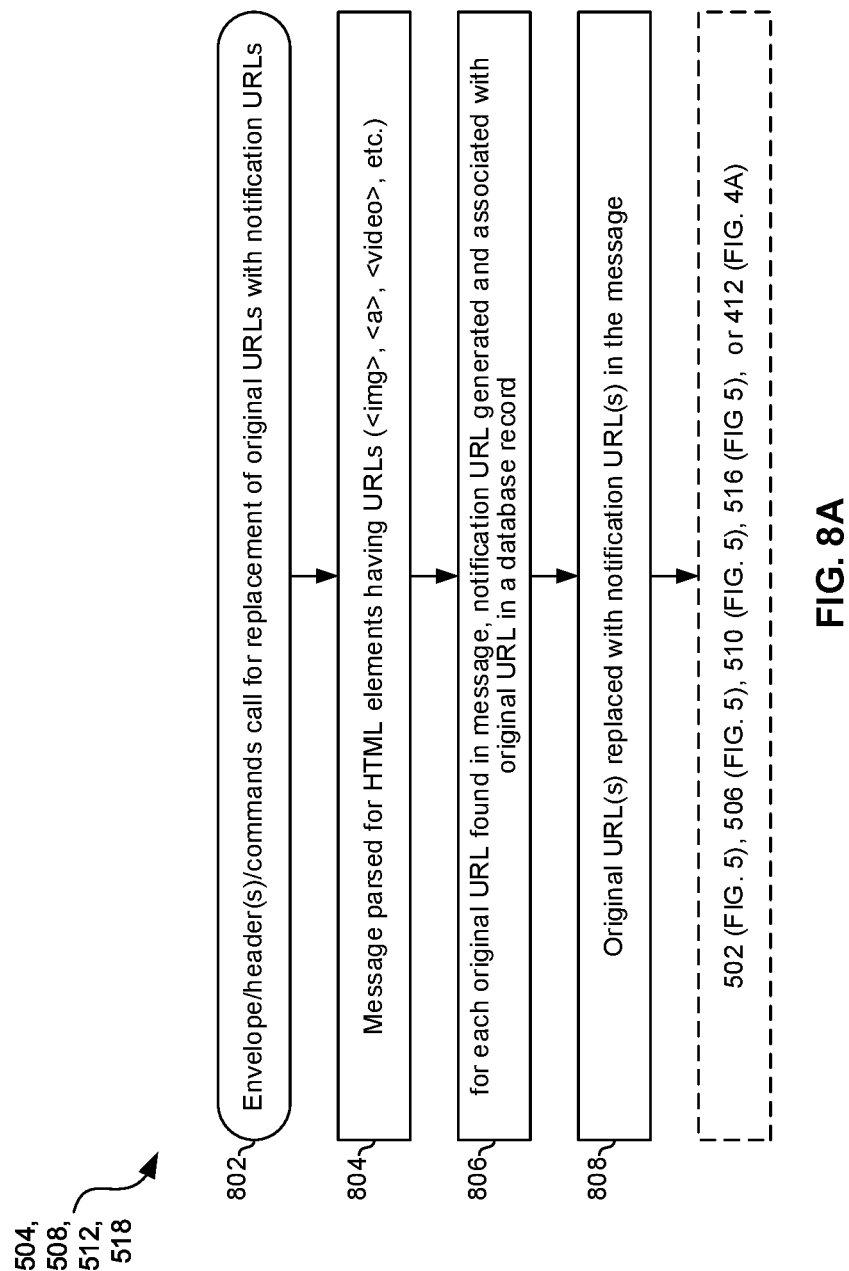

```
<HTML><div>
<div>#greeting</div>
<div>Lorem ipsum dolor sit
amet, consectetur
adipiscing elit</div>
<div>#customtext<div>
<div>Ut enim ad minim
veniam, quis nostrud
exercitation ullamco laboris
nisi ut aliquip ex ea
commodo consequat</div>
<div>#closing</div>
<div><?HTML>
``` template1 loaded in database

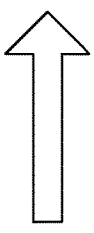

FIG. 12B

| Envelope | |
|---|---|
| 1222 | subject: #template1 |
| 1224 | Other original message header fields |
| 1226 | #greeting:"Hi John"<br>#customtext:"ed do eiusmod tempor"<br>#closing:"See you next week at the game!" | in-line processing per FIG. 12A

| Envelope | |
|---|---|
| 1222 | Other original message header fields |
| 1224 | from-custom-handler header field(s) |
| 1226 | `<HTML><div>`<br>`<div>`Hi John`</div>`<br>`<div>`Lorem ipsum dolor sit amet, consectetur adipiscing elit`</div>`<br>`<div>`ed do eiusmod tempor`<div>`<br>`<div>`Ut enim ad minim veniam, quis nostrud exercitation ullamco laboris nisi ut aliquip ex ea commodo consequat`</div>`<br>`<div>`See you next week at the game!`</div>`<br>`<div><?HTML>` |

FIG. 12C

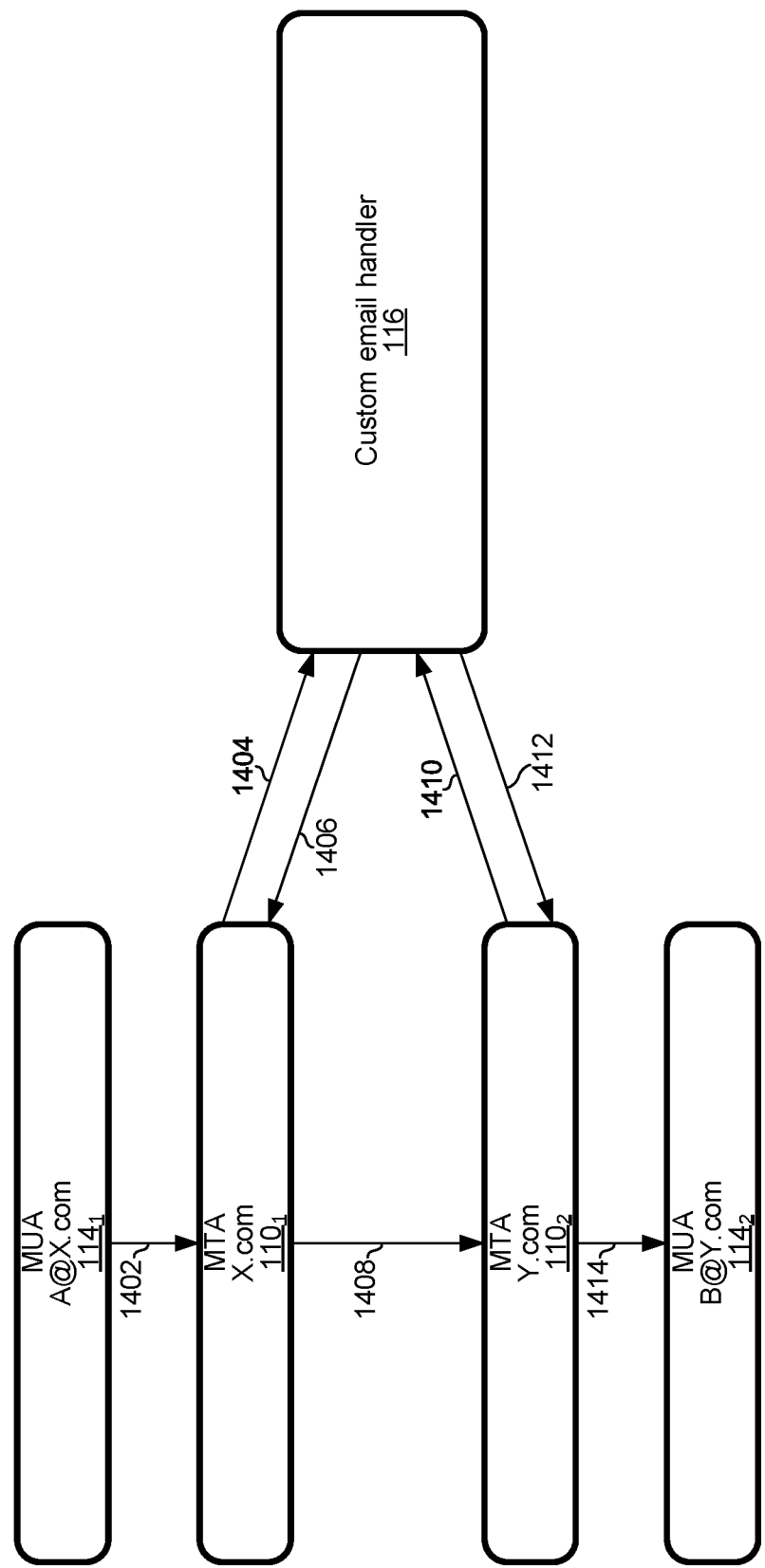

1450 — 1402
```
Fr: a@X.com
To: b@Y.com
[other original header fields]
```

1450 — 1404
```
Fr: a@X.com
To: b@Y.com
SecurityKey:ZB#G=|pP
CustomerID:1
[other original header fields]
```

1450 — 1406, 1408
```
Fr: a@X.com
To: b@Y.com
Processed-customer-1:true
[other original header fields]
```

1450 — 1410
```
Fr: a@X.com
To: b@Y.com
Processed-customer-1:true
SecurityKey:_r$G3kz2
CustomerID:2
[other original header fields]
```

1450 — 1412
```
Fr: a@X.com
To: b@Y.com
Processed-customer-1:true
Processed-customer-2:true
[other original header fields]
```

FIG. 14B

METHOD AND SYSTEM FOR DISAMBIGUATED EMAIL NOTIFICATIONS

PRIORITY CLAIM

This application is a continuation of U.S. patent application Ser. No. 15/378,259 filed on Dec. 14, 2016, which is a continuation of U.S. patent application Ser. No. 14/992,194 filed on Jan. 11, 2016. Each of the above referenced applications is hereby incorporated herein by reference.

BACKGROUND

Limitations and disadvantages of conventional approaches to email will become apparent to one of skill in the art, through comparison of such approaches with some aspects of the present method and system set forth in the remainder of this disclosure with reference to the drawings.

BRIEF SUMMARY

Methods and systems are provided for a client agnostic email processing system, substantially as illustrated by and/or described in connection with at least one of the figures, as set forth more completely in the claims.

BRIEF DESCRIPTION OF THE DRAWINGS

FIG. 7A is a flowchart illustrating an example implementation in which one of the blocks of FIG. 5A calls for the custom email handler to replace email message content with a hyperlink to securely hosted content.

FIG. 8A is a flowchart illustrating an example implementation in which one of the blocks of FIG. 5A calls for replacing original URLs in an email message with notification URLs.

FIGS. 12B and 12C illustrate an example implementation of the process of FIG. 12A.

FIG. 14A illustrates a third example flow of an email message through the network of FIG. 1.

FIG. 14B illustrates example details of the email message of FIG. 14A.

DETAILED DESCRIPTION

Figure 1:
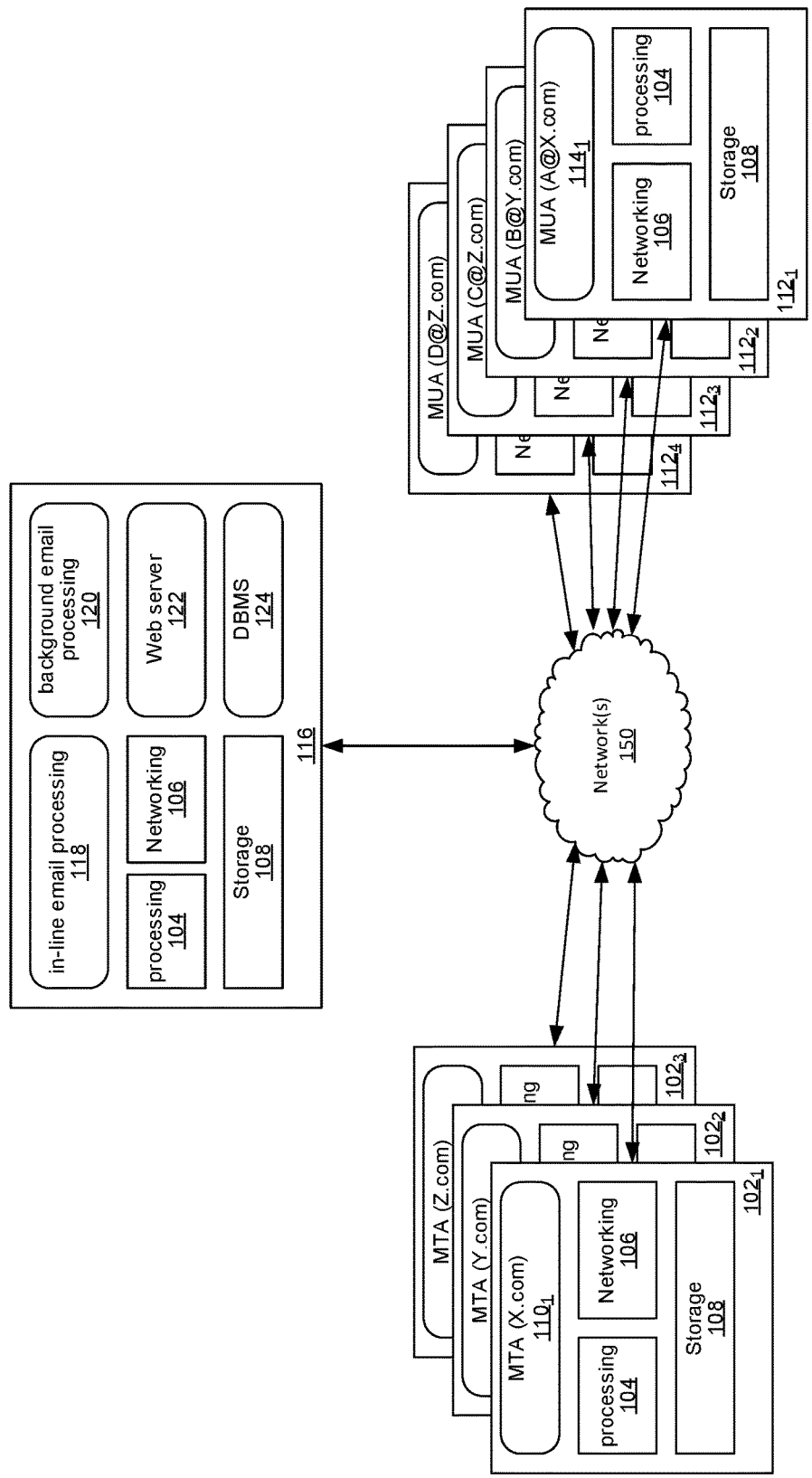
FIG. 1 illustrates an example system configured to provide client agnostic email processing.

FIG. 1 illustrates an example system configured to provide client agnostic email processing. The system comprises a plurality of devices 102 (e.g., servers), a plurality of devices 112 (e.g., desktop computers, laptop computers, tablet computers, and/or smartphones), and a custom email handler 116 (e.g., one or more servers).

Each of the devices $102_x$ (x between 1 and 3 in the example shown, where 3 was chosen arbitrarily for illustration) (e.g., servers residing in a data center) comprises processing circuitry 104 (e.g., a chipset or system on chip comprising a CPU, memory, graphics processor, I/O controller, etc.), network interface circuitry 106 (e.g., Ethernet, Wi-Fi, and/or the like) and storage circuitry 108 (e.g., HDD, SSD, and/or the like, and associated control/drive circuitry) configured (e.g., via an application specific circuit, firmware, and/or software) to operate as a mail transfer agent (MTA) $110_x$. For purposes of illustration, three MTAs $110_1$-$110_3$ associated with three domains are shown, but in implementation any number of MTAs 110 associated with any number of domains may be handled by custom email handler 116.

Each of the devices $112_y$ (y between 1 and 4 in the example shown, where 4 was chosen arbitrarily for illustration) comprises processing circuitry 104 (e.g., a chipset or system on chip comprising a CPU, memory, graphics processor, I/O controller, etc.), network interface circuitry 106 (e.g., Ethernet, Wi-Fi, and/or the like) and storage circuitry 108 (e.g., HDD, SSD, and/or the like, and associated control/drive circuitry) configured (e.g., via an application specific circuit, software, and/or firmware) to operate as a mail user agent (MUA) 114 (also referred to as an "email client"). For example, MUAs $114_1$ and $114_2$ may each be a locally-installed MUA (e.g., Outlook, Outlook Express, or the like) and MUAs $114_3$ and $114_4$ may be "webmail" type MUAs running in a web browser (e.g., Gmail.com®, Outlook.com®, and/or the like). For clarity of description, the devices 112 will be referred to below as "MUAs 114." For purposes of illustration, four MUAs $114_1$-$114_4$ associated with three domains are shown, but in implementation any number of MUAs 114 associated with any number of domains may be handled by custom email handler 116.

The custom email handler 116 comprises processing circuitry 104 (e.g., a chipset or system on chip comprising a CPU, memory, graphics processor, I/O controller, etc.), network interface circuitry 106 (e.g., Ethernet, Wi-Fi, and/or the like) and storage circuitry 108 (e.g., HDD, SSD, and/or the like, and associated control/drive circuitry) configured (e.g., via an application specific circuit, software, and/or firmware) to operate as an in-line email processing circuitry 118, background email processing circuitry 120, web server circuitry 122, and database management system (DBMS) 124 (for simplicity of description, the DBMS 124 and an underlying database in storage 108 is referred to as simply a "database"). The custom email handler 116 may be part of one or more of the domains associated (e.g., in a DNS record) with the MTAs $112_1$-$112_3$ and/or may be part of a separate domain. The custom email handler 116, or components thereof, may reside on one or more of the devices $102_1$-$102_3$, on one or more of the devices $112_1$-$112_4$, and/or on devices separate from the devices $102_1$-$102_3$ and $112_1$-$112_4$.

The in-line email processing circuitry 118 is configured to receive an email message that is in route to one or more recipients (e.g., indicated by "RCPT TO:" field(s) of the email message where SMTP is used), process the email message, and then allow the email message to continue on to the intended recipients and/or return the email message to its original sender. That is, the processing by in-line email processing circuitry 118 occurs in line with the delivery of the email message, and thus aspects of this disclosure pertain to reducing duration of in-line processing so as to reduce delay in email message delivery.

The background email processing circuitry 120 is configured to process email messages (and/or data extracted from email messages and/or metadata about email messages) in parallel with the email messages being delivered to their intended recipients. That is, processing by background email processing circuitry 120 does not delay delivery of the email messages.

Figure 2A:
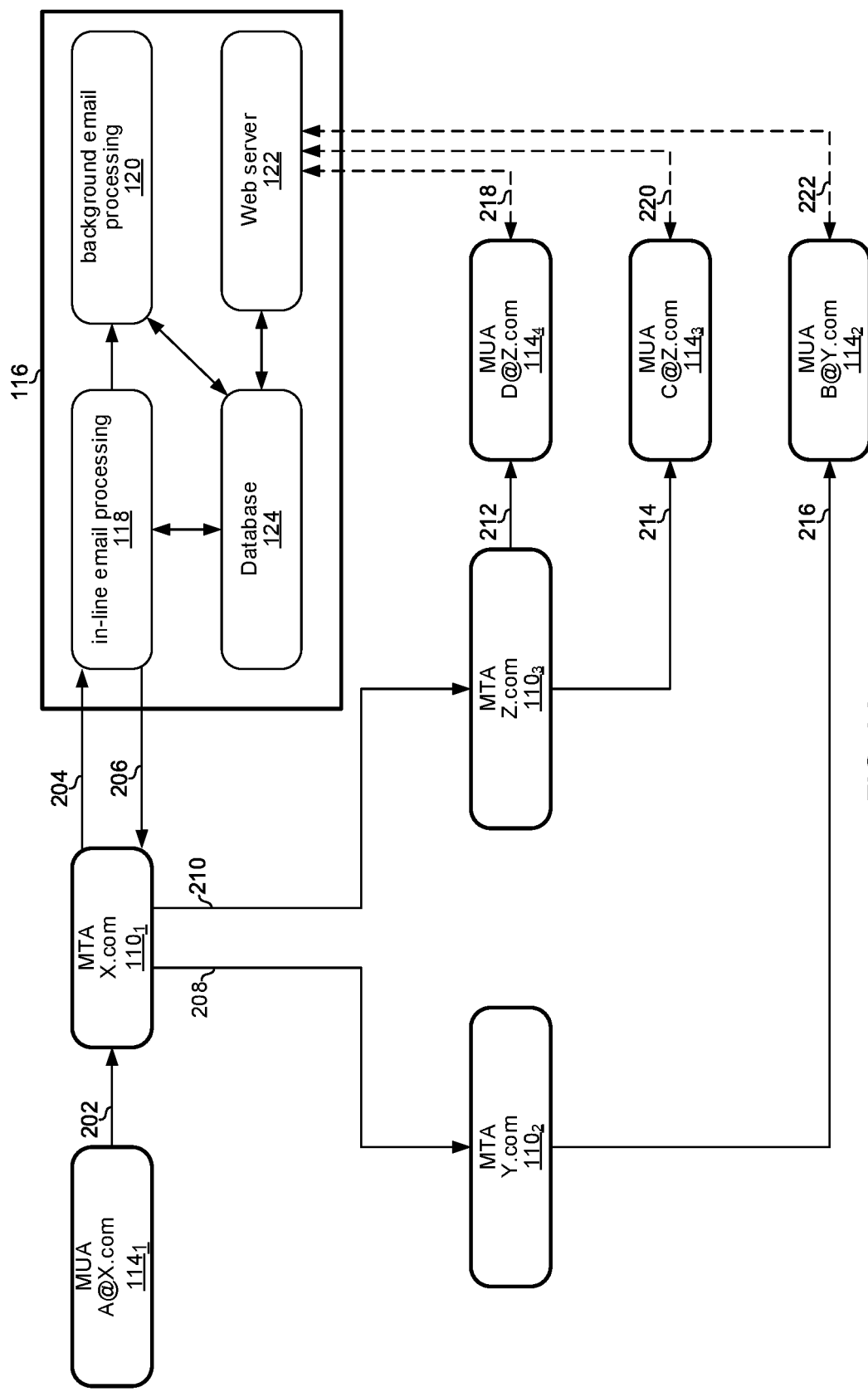
FIG. 2A illustrates a first example flow of an email message through the system of FIG. 1.

FIG. 2A illustrates a first example flow of an email message through the system of FIG. 1. In the example shown, a user A@X.com is sending an email message to three recipients: B@Y.com, C@Z.com, and D@Z.com. First, indicated by arrow 202, the message is sent from sender A's MUA $114_1$ to MTA $110_1$ (e.g., an MTA, referred to here as "sender MTA", which is configured into an "outgoing mail server" or similar setting of the MUA $114_1$). The MTA $110_1$ performs the process of FIG. 3, and, in the example of FIG. 2A, determines to send the message to in-line email processing circuitry 118 of custom email handler 116, as indicated by arrow 204. The custom email handler 116 receives the email message, performs custom in-line processing on the email message (which may involve interacting with database 124, queuing the message for processing by background email processing circuitry 120, and/or other operations internal to the custom email handler 116), and then returns the email message to MTA $110_1$, as indicated by arrow 206. MTA $110_1$ then sends the email message to MTA $110_2$ and the MTA $110_3$ (indicated, respectively, by the DNS records for Y.com and Z.com and each of which is referred to here as a "recipient MTA"). This is shown as arrows 208 and 210, respectively. MUAs $114_4$ and $114_3$ then retrieve the email message from MTA $110_3$, as indicated by arrows 212 and 214, and MUA $114_2$ retrieves the message from MTA $110_2$ (arrow 216). In instances that the email message contains remotely hosted content (e.g., images, videos, etc.) and/or hyperlinks, the MUAs $114_2$, $114_3$, and $114_4$ may interact with the web server circuitry 122 as indicated by arrows 218, 220, and 222. It is noted that, although the same MTA $110_x$ may be both the sender MTA and the recipient MTA (e.g., for a message from C@Z.com to D@Z.com the MTA $110_3$ may be both the sender MTA and the recipient MTA), as used herein, the first time the email message arrives at the MTA $110_x$ it is considered to have visited the sender MTA and not the recipient MTA—it is considered to have visited the recipient MTA only after returning from custom email handler 116.

Figure 2B:
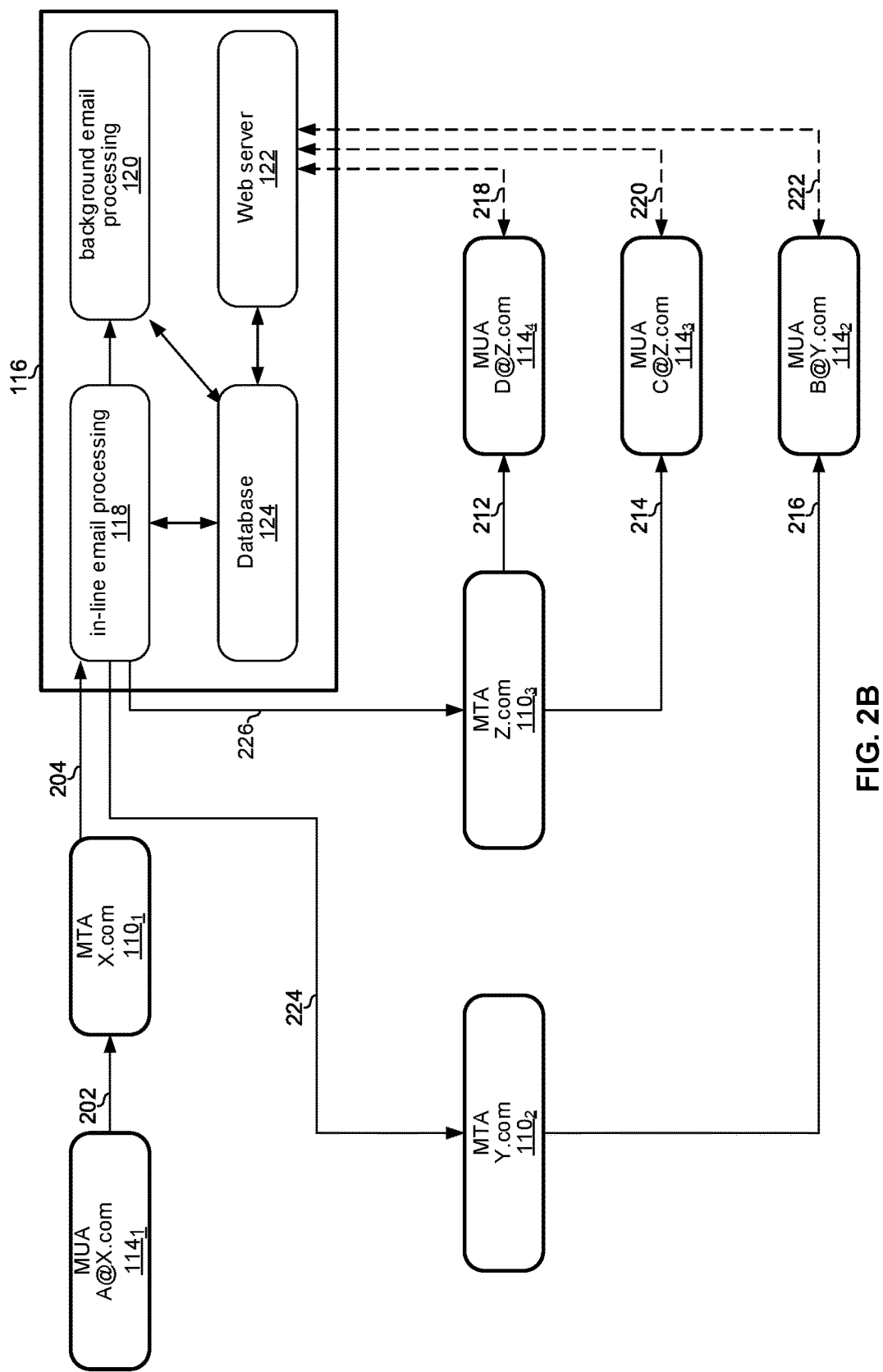
FIG. 2B illustrates a second example flow of an email message through the system of FIG. 1.

FIG. 2B illustrates a second example flow of an email message through the system of FIG. 1. FIG. 2B differs in that, instead of the custom email handler 116 returning the message to the sender MTA $110_1$, it sends the message directly to the recipients' MTAs $110_2$ and $110_3$, as indicated by arrows 224 and 226.

Figure 2C:
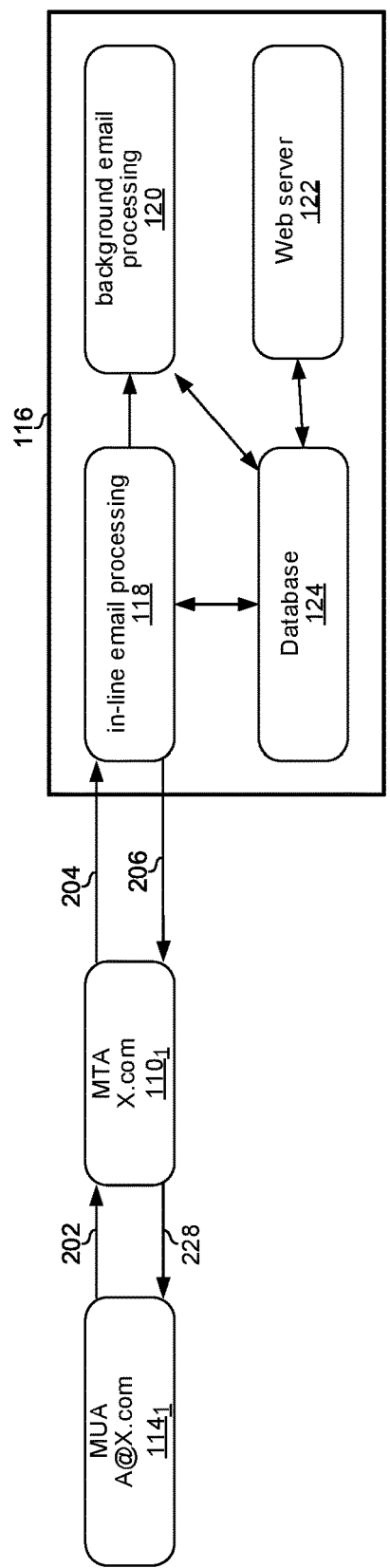
FIG. 2C illustrates a third example flow of an email message through the system of FIG. 1.

FIG. 2C illustrates a third example flow of an email message through the system of FIG. 1. In FIG. 2C, the flow starts out the same as FIG. 2A with arrows 202, 204, and 206, but in the case of FIG. 2C the email message is retrieved from MTA $110_1$ by the sender MUA $114_1$. This may be because the email message was self-addressed to A@X.com or because the email message was bounced back to A@X.com (even though A@X.com was not in the "to:," "cc:" or "bcc:" header fields) as a result of rules applied by the custom email handler 116.

In an example implementation, communications between the MTAs 110 and the custom email handler 116 use the simple mail transfer protocol (SMTP), communications between the MUAs and the MTAs use the post office protocol 3 (POP3) and/or internet message access protocol (IMAP), and communications between the MUAs 114 and the web server circuitry 122 use hypertext transfer protocol (HTTP). Aspects of this disclosure, however, are not dependent on the use of these protocols and any suitable protocols may be used.

Figure 3:
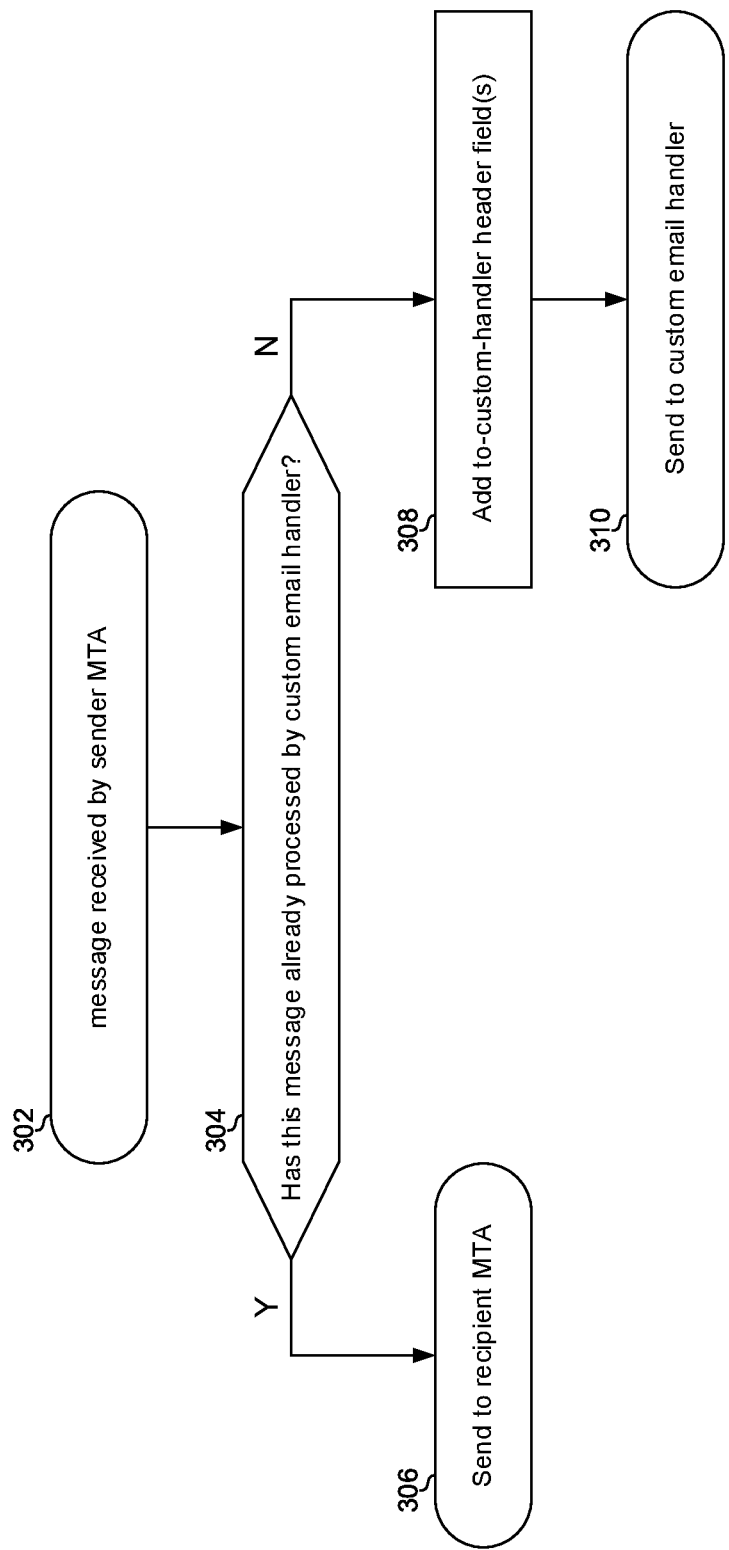
FIG. 3 is a flowchart illustrating an example process performed by a mail transfer agent (MTA) of FIG. 1.

FIG. 3 is a flowchart illustrating an example process performed by a sender MTA, such as $110_1$ in FIGS. 2A-2C. In block 302, the sender MTA receives the email message (e.g., indicated by arrow 202 in FIGS. 2A-2C). In block 304, it determines whether the email message has already been processed by the custom email handler 116. The determination may, for example, be determined based on one or more fields of the email message's envelope, one or more of the message's header fields, and/or the message body of the email message. In an example implementation, this may comprise looking for one or more header fields added by the custom email handler 116, which are referred to herein as "from-custom-handler" header fields. If the message has not already been processed by custom email handler 116, then the process advances to block 308. In block 308, the sender MTA adds one or more header fields (referred to here as "to-custom-handler" header fields) that may be used by the custom email handler 116. In an example implementation, the to-custom-handler header(s) comprise(s) an identifier associated with the sender in a database of the custom email handler 116 and a security key associated with the sender in a database of the custom email handler 116. The identifier may, for example, be a SHA-1 hash of the sender's domain (e.g., X.com in FIGS. 2A-2C) and the security key may, for example, comprise a random string uniquely associated with the sender, the sender's domain, and/or an authorized group to which the sender belongs. In block 310, the message is sent to custom email handler 116. Returning to block 304, if the message has already been processed by custom email handler 116, then the process advances to block 306 and the message is sent to the recipient MTA(s).

Figure 4A:
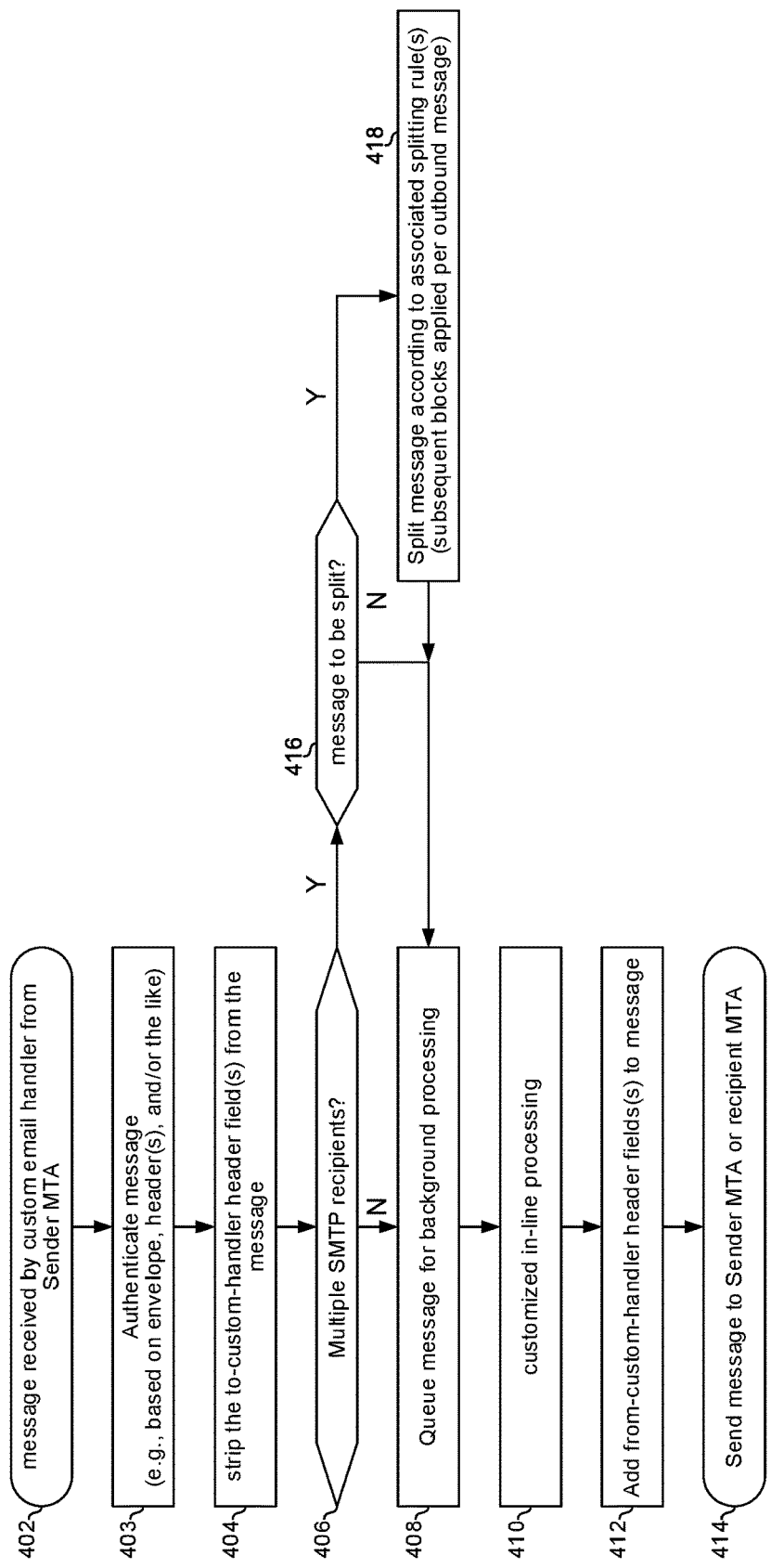
FIG. 4A is a flowchart illustrating example in-line processing performed by the customized email handler of FIG. 1.

FIG. 4A is a flowchart illustrating example in-line processing performed by the customized email handler of FIG. 1. The process begins with block 402 in which a message is received by the custom email handler 116 from a sender MTA. Next, in block 403, the custom email handler 116 authenticates the email message. The authentication may, for example, be based on one or more fields of the email message's envelope, one or more of the email message's header fields, and/or the email message's body (which, for SMTP, begins after the first blank line in the email message). In an example implementation, this may comprise checking and/or validating the content of one or more to-custom-handler header fields added by the sender MTA. In block 404, to-custom-handler header field(s) added by the sender MTA are stripped from the message (for implementations using such header field(s)). In block 406, the message is parsed to determine whether the email message is intended for multiple recipients. This may comprise, for example, parsing the envelope to detect whether there are multiple "RCPT TO:" fields. If there are not multiple recipients, then the process advances to block 408. In block 408, the message is added to a queue to await processing by background email processing circuitry 120. The process then proceeds to block 410 without waiting for background processing to complete (i.e., background processing is asynchronous with respect to in-line processing shown in FIG. 4A). In block 410, customized in-line processing is performed on the message by in-line email processing circuitry 118. Example details of block 410 are described below with reference to FIG. 5. Next, in block 412, the in-line email processing circuitry 118 adds one or more from-custom-handler header field(s) to the message. Next, in block 414, the message is sent to the sender MTA (e.g., as in FIGS. 2A and 2C) or to recipient MTA (e.g., as in FIG. 2B).

Returning to block 406, if the message is destined for multiple recipients, the process advances to block 416. In block 416, the in-line email processing circuitry 118 determines whether the inbound message is to be repackaged into multiple outbound messages, with each of the outbound messages having a different envelope (e.g., each destined for only a single SMTP recipient). It is noted that, for clarity of description, the message before repackaging is referred to herein as the "inbound message" and the messages after splitting are referred to as "outbound messages," but the inbound and outbound messages may have the same message-id and possibly other commonalities (in some instances an inbound message and its outbound messages may iden- tical other than their envelopes). The determination of block 416 may be based on custom processing rules associated with the inbound message in a database of the custom email handler 116. The association with the message may, for example, be based on one or more fields of the inbound message's envelope, one or more of the inbound message's header fields, and/or the inbound message's body. For example, rules may be stored per sender, per group-of-senders, per recipient, per group-of-recipients, per domain, per group-of-domains, per IP address, per group of IP addresses, per geographical location, per time of email message transmission or receipt, and/or the like. Any particular rule may determine whether to repackage an inbound message based on one or more fields of the inbound message's envelope, one or more of the inbound message's header fields, and/or the inbound message's body. As just a few non-limiting examples of possible rules for deciding whether to repackage an inbound message: decide whether to repackage the inbound message based on its content type header field (e.g., do not repackage messages with content type multipart); decide whether to repackage the inbound message based on whether it has one or more attachments (e.g., do not repackage messages with attachments); decide whether to repackage the inbound message based on its size (e.g., do not repackage email messages over a certain size); decide whether to repackage the inbound message based on its "to:", "cc:", and "bcc" header fields (e.g., do not repackage messages with more than N (an integer) recipients); and decide whether to repackage the inbound message based on number of recipients and email message size (e.g., do not repackage message if number of recipients multiplied by size of message is above a determined threshold). If the inbound message is not to be repackaged, the process advances to block 408 (described above). If the inbound message is to be repackages, the process advances to block 418.

In block 418, the message is repackaged according to repackaging rules associated with the inbound message and/or repackaging rules associated with the outbound messages. As in block 416, the association of a repackaging rule with the inbound message may, for example, be based on one or more fields of the inbound message's envelope, one or more of the inbound message's header fields, and/or the inbound message's body. Similarly, the association of a repackaging rule with an outbound message may, for example, be based on one or more fields of the outbound message's envelope, one or more of the outbound message's header fields, and/or the outbound message's body. As just a few non-limiting examples of possible rules for deciding how to repackage an inbound message: decide how to repackage the inbound message based on whether it has one or more attachments (e.g., do not copy the attachments to the outbound messages but instead store the attachment and insert a hyperlink); and decide how to repackage the inbound message based on its "to:", "cc:", and "bcc" header fields (e.g., copy attachments to outbound messages unless there are more than N recipients, in which case store attachments and send link). After repackaging in block 418, the process advances to block 408 and the remaining blocks 408, 410, 412, and 414, described above, are performed per outbound message. In this manner, repackaging enables the custom email handler 116 to process the inbound message differently for different recipients.

Figure 4B:
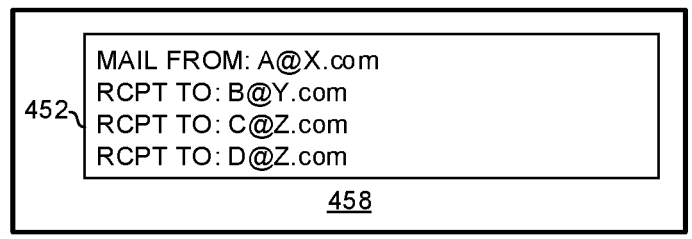
FIG. 4B illustrates example details of repackaging an email message into multiple envelopes.
Figure 4B:
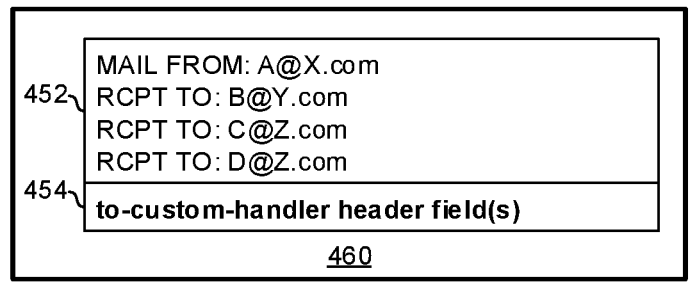
Figure 4B:
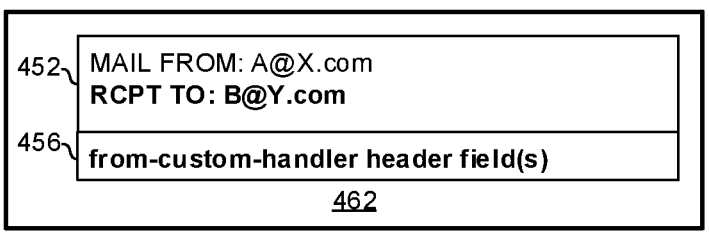
Figure 4B:
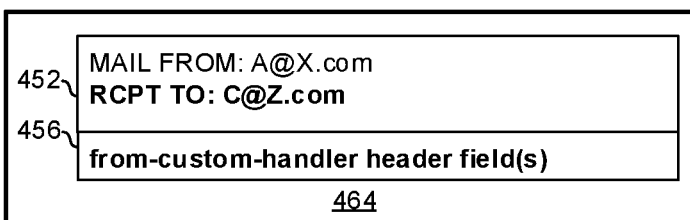
Figure 4B:

FIG. 4B illustrates example details of repackaging an inbound message into multiple outbound messages. Called out as 458 is the inbound message as it arrives at the sender MTA (e.g., along the arrow 202 in FIG. 2A). The envelope 452 (other components of the message 458 are omitted for clarity of illustration) comprises three recipients: B@Y.com, C@Z.com, and D@Z.com. Called out as 460 is the inbound message as it leaves the sender MTA destined for the custom email handler (e.g., along the arrow 204 in FIG. 2A). The sender MTA has added the to-custom-handler header field(s) 454. Called out as 462 is a first outbound message (e.g., along the arrow 206 in FIG. 2A) resulting from repackaging of the inbound message 460 by the custom email handler 116. The outbound email message 462 has only a first of the three recipients in its envelope 452, and has one or more from-custom-handler header fields 456. Called out as 464 is a second outbound message (e.g., along the arrow 206 in FIG. 2A) resulting from repackaging of the inbound message 460 by the custom email handler 116. The outbound email message 464 has only a second of the three recipients in its envelope 452, and has one or more from-custom-handler header fields 456. Called out as 466 is a third outbound message (e.g., along the arrow 206 in FIG. 2A) resulting from repackaging of the inbound message 460 by the custom email handler 116. The email message 466 has only a third of the three recipients in its envelope 452, and has one or more from-custom-handler header fields 456. In this manner, each of the outbound email messages 462, 464, and 466 can be processed differently by the custom email handler 116.

Figure 5A:
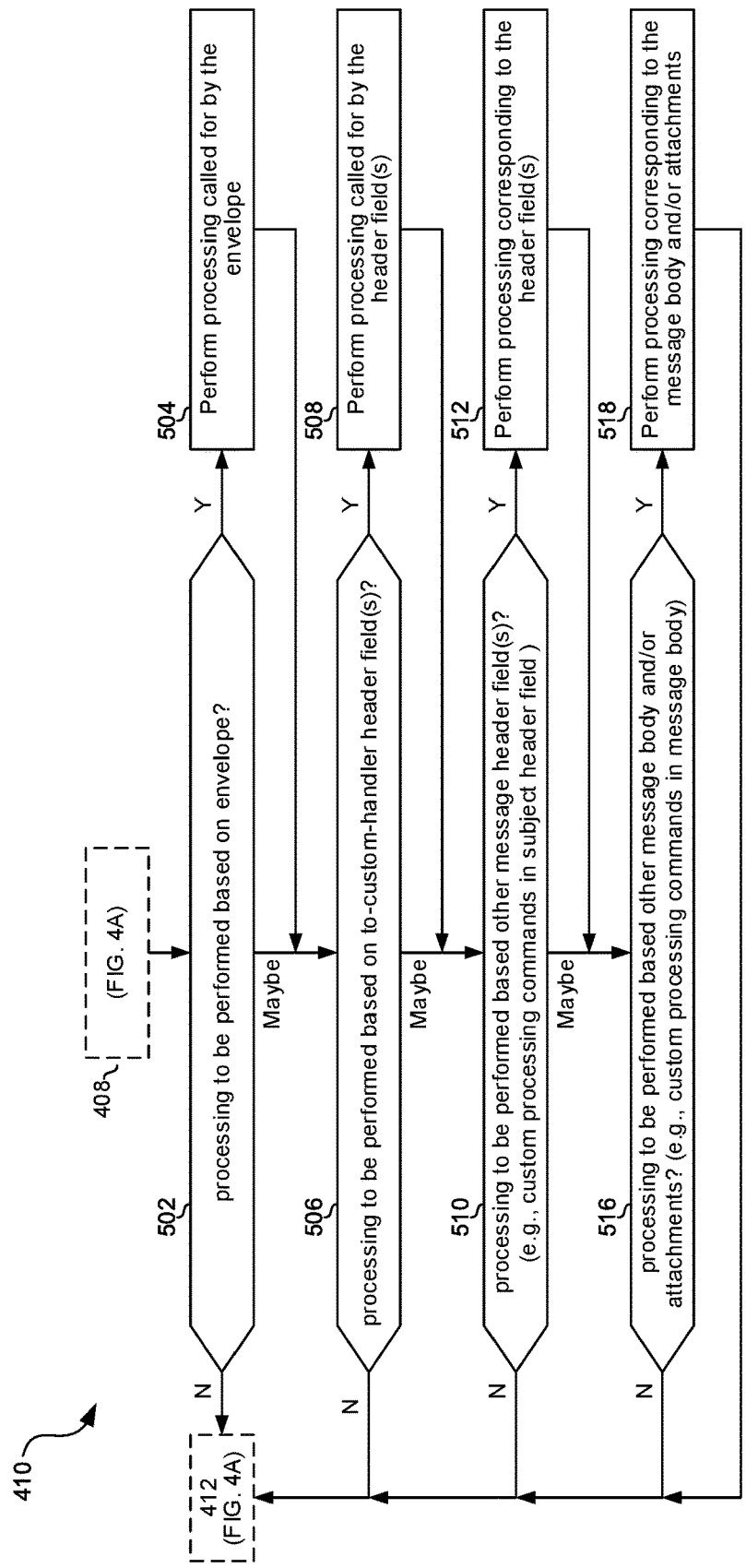
FIG. 5A is a flowchart illustrating an example implementation of the customized email processing block of FIG. 4A.

FIG. 5A is a flowchart illustrating an example implementation of the customized email processing block 410 of FIG. 4.

In block 502, the custom email handler 116 parses the envelope of the email message. If the envelope of the email message dictates that no custom processing of the email message is to be performed, then the process advances to block 412 of FIG. 4. If the envelope of the message dictates some particular custom processing to be performed on the message, then the process advances to block 504 and the custom processing is performed. If the envelope of the message indicates that custom processing of the message is possibly called for, then the process advances to block 506.

In block 506, the custom email handler 116 parses the to-custom-handler header field(s) of the email message (which may have been automatically inserted by the sender MTA). If the to-custom-handler header field(s) of the message dictate(s) that no custom processing of the message is to be performed, then the process advances to block 412 of FIG. 4. If the to-custom-handler header field(s) of the message dictate(s) some particular custom processing to be performed on the message, then the process advances to block 508 and the custom processing is performed. If the to-custom-handler header field(s) of the message indicates that custom processing of the message is possibly called for, then the process advances to block 510.

In block 510, the custom email handler 116 parses one or more other header field(s) of the email message. One or more of the other header field(s) (such as "message-id") may comprise text automatically generated by the sender MUA and/or the sender MTA. One or more of the other message header fields, such as the "to:," "Cc:," "Bcc:" and "subject:" header fields, may comprise text entered by a sender of the email message via a compose interface provided by the sender MUA. For example, referring briefly to FIG. 5B, there is shown a compose interface 552 of a webmail MUA running in a browser window 550. The MUA puts one or more email addresses entered by the sender (e.g., typed, copy-pasted, selected from a dropdown list, etc.) into interface element 554 into one or more "to:" message header fields of a resulting email message, the MUA puts one or more email addresses entered by the sender into interface element 556 into one or more "Cc:" message header fields of the resulting email message, the MUA puts one or more email addresses entered by the sender into interface element 558 into one or more "Bcc:" message header fields of the resulting email message, the MUA puts text entered by the sender into the interface element 560 into a "subject" message header field of the resulting email message, the MUA puts text entered by the sender into the interface element 562 into the message body of the resulting email message.

Returning to block 510 of FIG. 5A, if the other message header field(s) of the message dictate(s) that no custom processing of the message is to be performed, then the process advances to block 412 of FIG. 4. If the other message header field(s) of the message dictate(s) some particular custom processing to be performed on the message, then the process advances to block 518 and the custom processing is performed. If the other message header field(s) of the message indicate(s) that custom processing of the message is possibly called for, then the process advances to block 516.

In block 516, the custom email handler 116 parses the message body and/or attachments. If the message body and/or attachment(s) dictate(s) that no custom processing of the message is to be performed, then the process advances to block 412 of FIG. 4. If the message body and/or attachments dictate(s) some particular custom processing to be performed on the message, then the process advances to block 518 and the custom processing is performed.

Figure 5B:
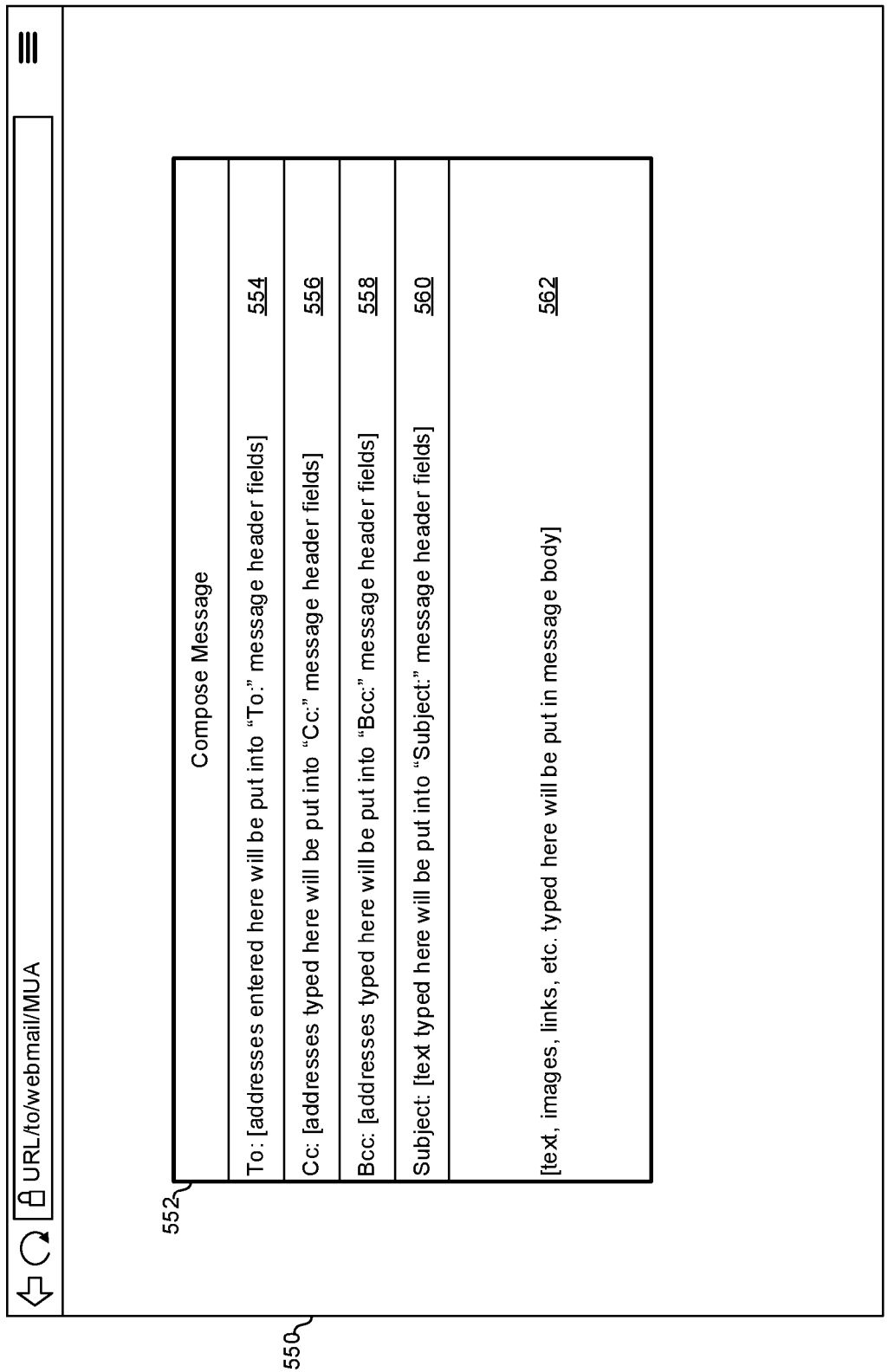
FIG. 5B illustrates an example email message composing interface of a MUA.

In block 510 and/or block 516, parsing may comprise searching for custom email processing commands entered by the sender of the email message (e.g., via the "compose message" interface of FIG. 5B). Custom processing commands may have a predefined format defined in a database of the custom email handler 116 such that the custom email handler 116 can reliably distinguish them from other text using, for example, regular expression matching. One example format of custom email processing commands is the hashtag format (i.e., #command). Since MUAs universally (or nearly so) enable a sender to input text in the field body of the subject field and in the message body of the email message, these two portions of email messages may be where the custom email handler 116 searches for custom processing commands. In an example implementation, the custom processing commands are plain text (e.g., with any desired encoding such as ASCII, UTF-8, UTF-16, etc.) and a subject header field or message body comprising a custom processing command is fully compliant with applicable standards (e.g., RFC 5322)). In this manner, regardless of the MUA a sender is using at any given time, s/he can easily provide custom processing commands to the custom email handler 116 without having to install a specific MUA, and without having to install any add-ons or plugins for his/her existing MUA. This enables providing custom email processing commands from, for example, any web browser in which a webmail MUA is running, and from any native MUA on a PC/tablet/smartphone/etc. (e.g., the "stock" mail client on Android®, iOS®, etc.). In an example implementation, custom processing commands are stripped from messages by the custom email handler 116 before the messages are forwarded on to the sender and/or recipient MTA(s) (such that the recipients are unaware the custom processing commands were ever present).

Figure 6A:
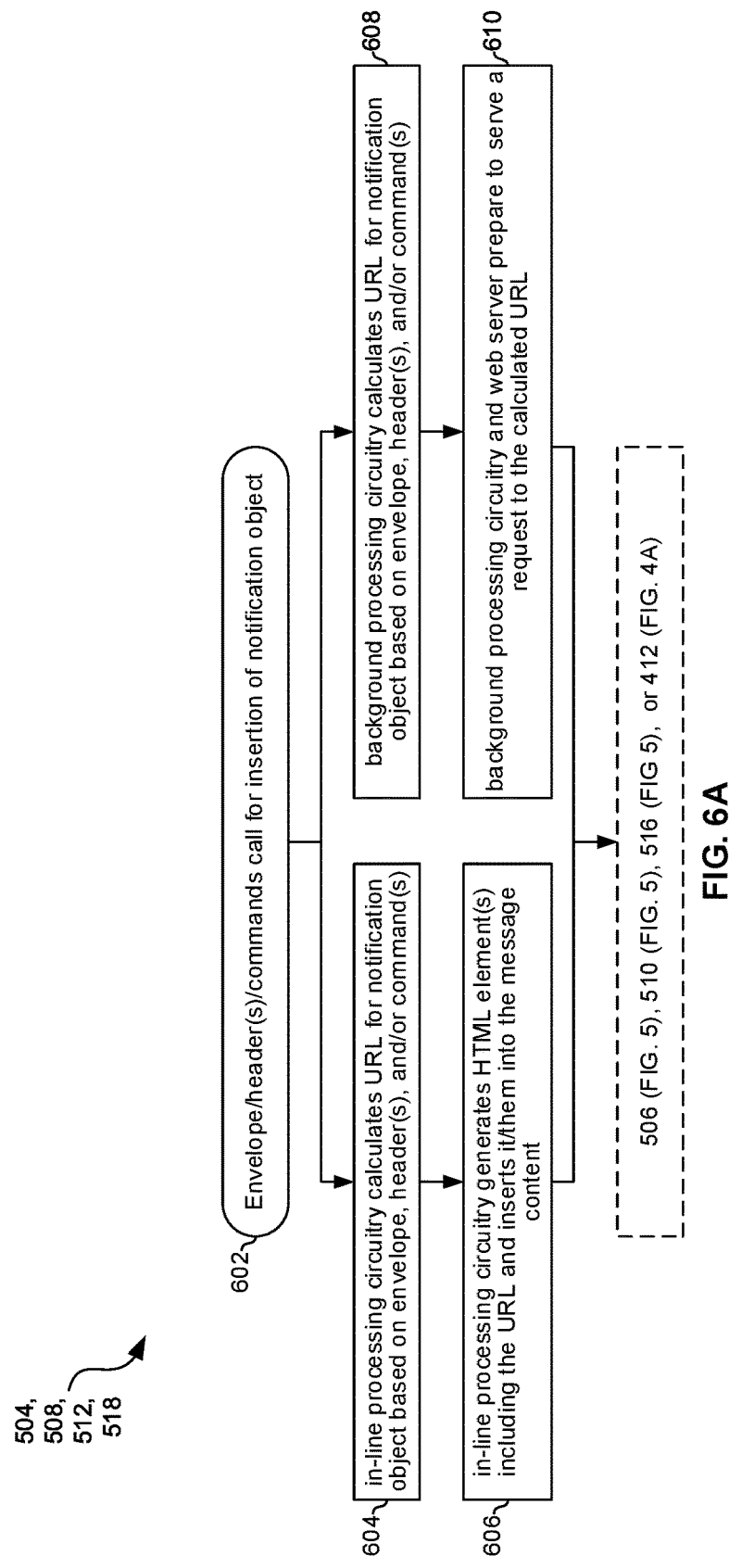
FIG. 6A is a flowchart illustrating an example implementation in which one of the blocks of FIG. 5A calls for the custom email handler to add of a notification object into an email message during in-line processing of the email message.

FIG. 6A is a flowchart illustrating an example implementation of one of the blocks 504, 508, 512, 518 of FIG. 5. In block 602, a rule associated with the envelope, header field(s), and/or message body of the email message calls for the custom email handler to insert a notification object into the message. From block 602, the process proceeds in parallel to blocks 604 and 608. In block 604, the in-line email processing circuitry 118 calculates a uniform resource locator (URL) for a notification object to be inserted into the message. The URL may, for example, be based on the envelope, header field(s), and/or custom-processing command(s) of the message. The URL may comprise, for example, one or more of: a hash of the sender's domain, a hash of the sender's email address; a hash of the body of the message-id header field; a random generator number that is unique (to a desired likelihood) to this particular URL, a value corresponding to the body of the message-id header filed encrypted with a security key that is associated with the sender and/or sender's domain in a database of the custom email handler 116. Then, in block 606, the in-line email processing circuitry 118 generates HTML element(s) including the URL calculated in block 604, and inserts the element(s) into the message's body. After block 606, the process advances to one of blocks 506, 510, 516, or 412 (depending on whether FIG. 6A corresponds to block 504, 508, 512, or 518).

In parallel with blocks 604 and 606 are blocks 608 and 610 (which may take place any time during or after performance of blocks 604 and 606 by the in-line email processing circuitry 118). In block 608, background email processing circuitry 120 independently calculates the same URL as calculated in block 604, described above. In block 610, the background email processing circuitry 120 prepares to receive a request at the calculated URL. This may comprise associating, in a database of the custom email handler, the calculated URL with content (e.g., an image file) to be served in a response to a received request for the calculated URL. This may also comprise, for example, parsing the email message to extract data from, and/or generate metadata about, the email message, and store such data and/or metadata to the database.

Figure 6B:
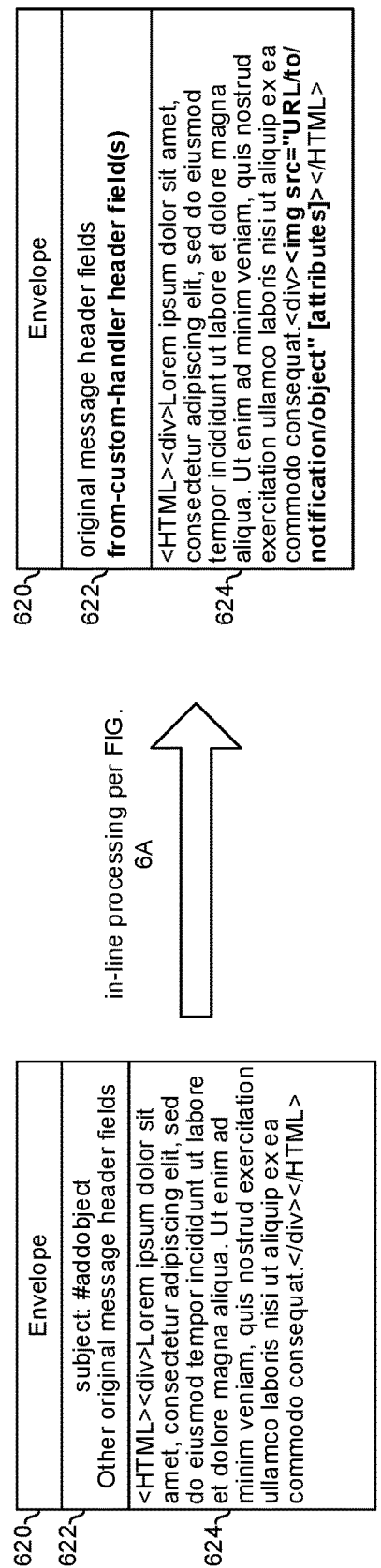
FIG. 6B illustrates an example implementations of the process of FIG. 6A in which a notification object is inserted into HTML-formatted email message body during in-line processing.

FIG. 6B illustrates an example implementations of the process of FIG. 6A in which a notification object is inserted into HTML formatted email message body during in-line processing. As shown, after in-line processing per the process of FIG. 6A, one or more from-custom-handler header fields 622 has been added to the message, and an HTML element containing the calculated URL has been inserted into the message body 624. In the example shown, insertion of the notification object is triggered by the custom processing command "#addobject." In another example, the default (for a particular user, group of users, and/or the like) may be to insert the notification but a custom processing command of "#noobject" in a particular email message may prevent insertion of a notification object for that particular message.

Figure 6C:
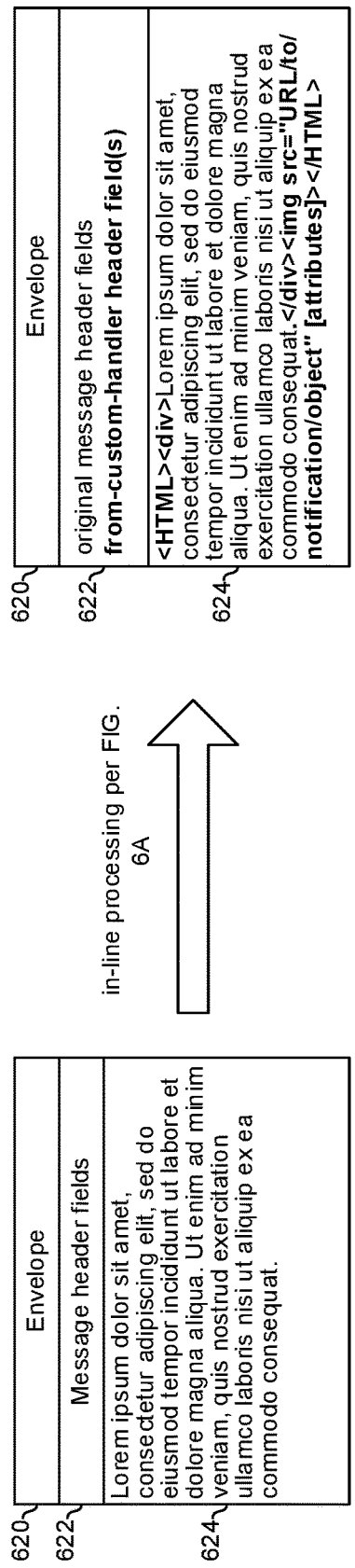
FIG. 6C illustrates an example implementations of the process of FIG. 6A in which plain text formatted email message content is converted to HTML-formatted email message content with a notification object.

FIG. 6C is similar to FIG. 6B, but since the message body of the email message was plain text, it has been converted to HTML to support the insertion of the HTML element with the calculated URL.

In an example implementation, custom processing commands may be used to control how and/or when the sender of an email message such as those in FIGS. 6B and 6C is notified that one or more recipients has opened the email message. For example, the custom processing command of "#notify" may result in the custom email handler 116 sending a notification email message to the original sender each time the message with notification object is opened. As another example, a custom processing command of "#notifyonce" may result in such a notification email message being sent only on the first opening of a particular email message by a particular recipient. As another example, a custom processing command of "#notifydaily" may result in the custom email handler 116 sending daily summary emails informing the sender about how many times the particular email message was opened, by whom, etc. for the preceding day.

Figure 6D:
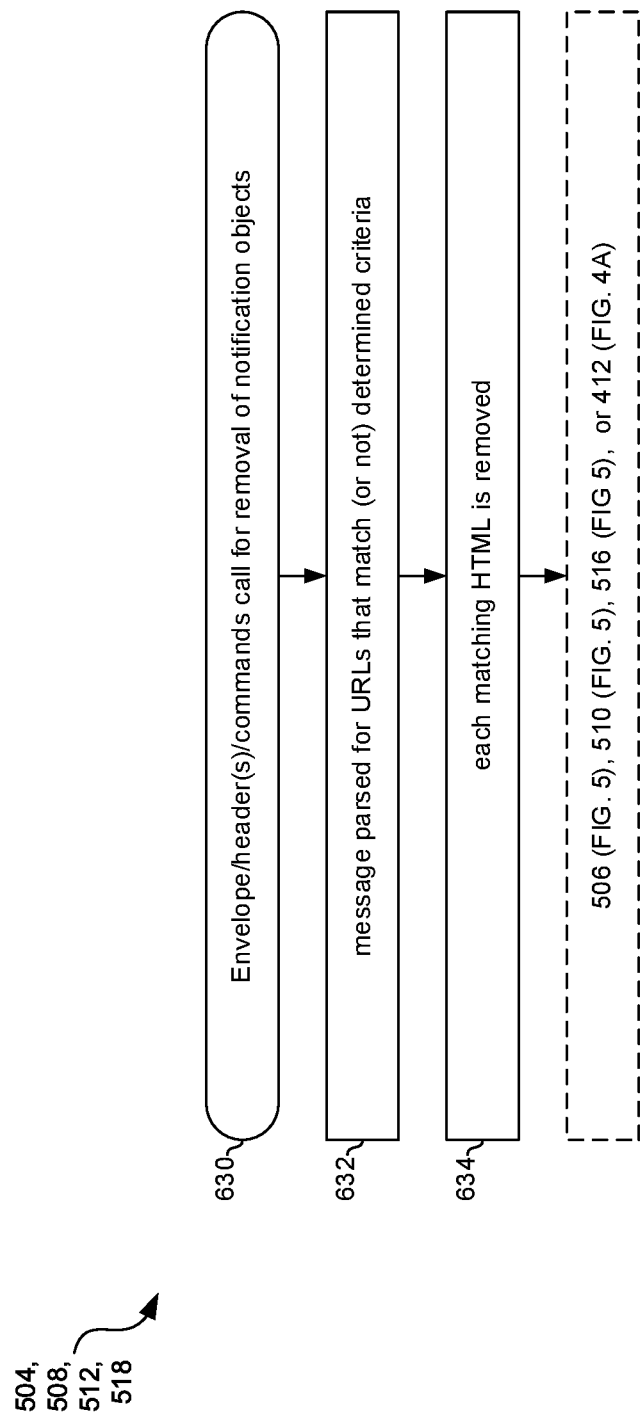
FIG. 6D is a flowchart illustrating an example implementation in which one of the blocks of FIG. 5A calls for the custom email handler to remove a notification object from an email message during in-line processing of the email message.

FIG. 6D is a flowchart illustrating an example implementation of one of the blocks 504, 508, 512, 518 of FIG. 5. In block 630, a rule associated with the envelope, header field(s), and/or message body of the email message calls for the custom email handler 116 to remove a notification object from the email message during in-line processing of the email message. In block 632, the in-line processing circuitry parses the message searching for URLs that match (or not) criteria associated with the message in a database of the custom email handler 116. The association with the message may, for example, be based on one or more fields of the message's envelope, one or more of the message's header fields, and/or the message's body (e.g., URL search criteria may be stored per sender, per group-of-senders, per recipient, per group-of-recipients, per domain, per group-of-domains, per IP address, per group of IP addresses, per geographical location, per time of email message transmission or receipt, and/or the like). The URL criteria may, for example, be regular expressions and/or substrings that match particular domains, particular sub-domains, particular protocols (e.g., http, https, ftp, etc.) particular HTTP GET parameters, and/or the like. In block 634, any matching URLs found in the email message (or in particular portions of the email message such its body) are removed.

Figure 6E:
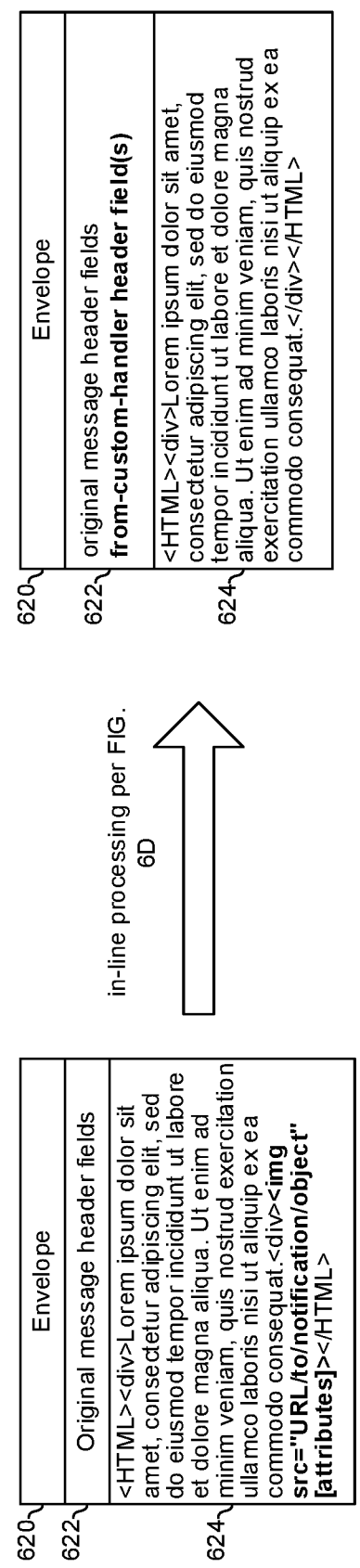
FIG. 6E illustrates an example implementations of the process of FIG. 6D in which a notification object is removed from email message during in-line processing of the email message.

FIG. 6E illustrates an example implementations of the process of FIG. 6D in which a notification object is removed from email message's content during in-line processing of the email message. As shown, after in-line processing per the process of FIG. 6D, one or more from-custom-handler header fields 622 has been added to the message, and the HTML element containing the URL has been removed. In another example implementation, the HTML element may be replaced with content of the same size (e.g., a URL to an image of size L×W is replaced by another URL to a placeholder image of size L×W, or a hyperlink replaced with another hyperlink of same number of characters) so as to avoid altering the layout/formatting of the email message.

FIG. 7A is a flowchart illustrating an example implementation of one of the blocks 504, 508, 512, 518 of FIG. 5. In block 702, a rule associated with the envelope, header field(s), and/or message body of the email message calls for the custom email handler 116 to replace content of the email message with one or more secure links to content hosted by the web server circuitry 122. In block 704, content is removed from the message and stored to a database of the custom email handler (in storage 108). In block 708, the in-line email processing circuitry 118 and/or web server circuitry 122 generate a URL pointing to the stored content. In block 708, an HTML element including the URL generated in block 706 is inserted into the message. In an example implementation, the HTML element may be a notification object such that, when the hyperlink is clicked, the fact that it was clicked and/or information such as the IP address, geographical location, type of computing device, and/or the like may be logged in a database of the customer email handler. This may be used to determine who has accessed the content (e.g., in the case of the content comprising sensitive information) and to control access to the content. For example, the URL may a one-time use such that, upon the first view the URL is disabled such that the hyperlink no longer points to it. As another example, the content may be "ephemeral" such that the content may only be viewed for a determined amount of time (e.g., a few seconds) and then URL expires such that subsequent request to it return a notice that the content has expired, return a redirect to another URL, and/or the like. Upon expiration, a redirect may trigger that causes the browser to leave the page.

Figure 7B:
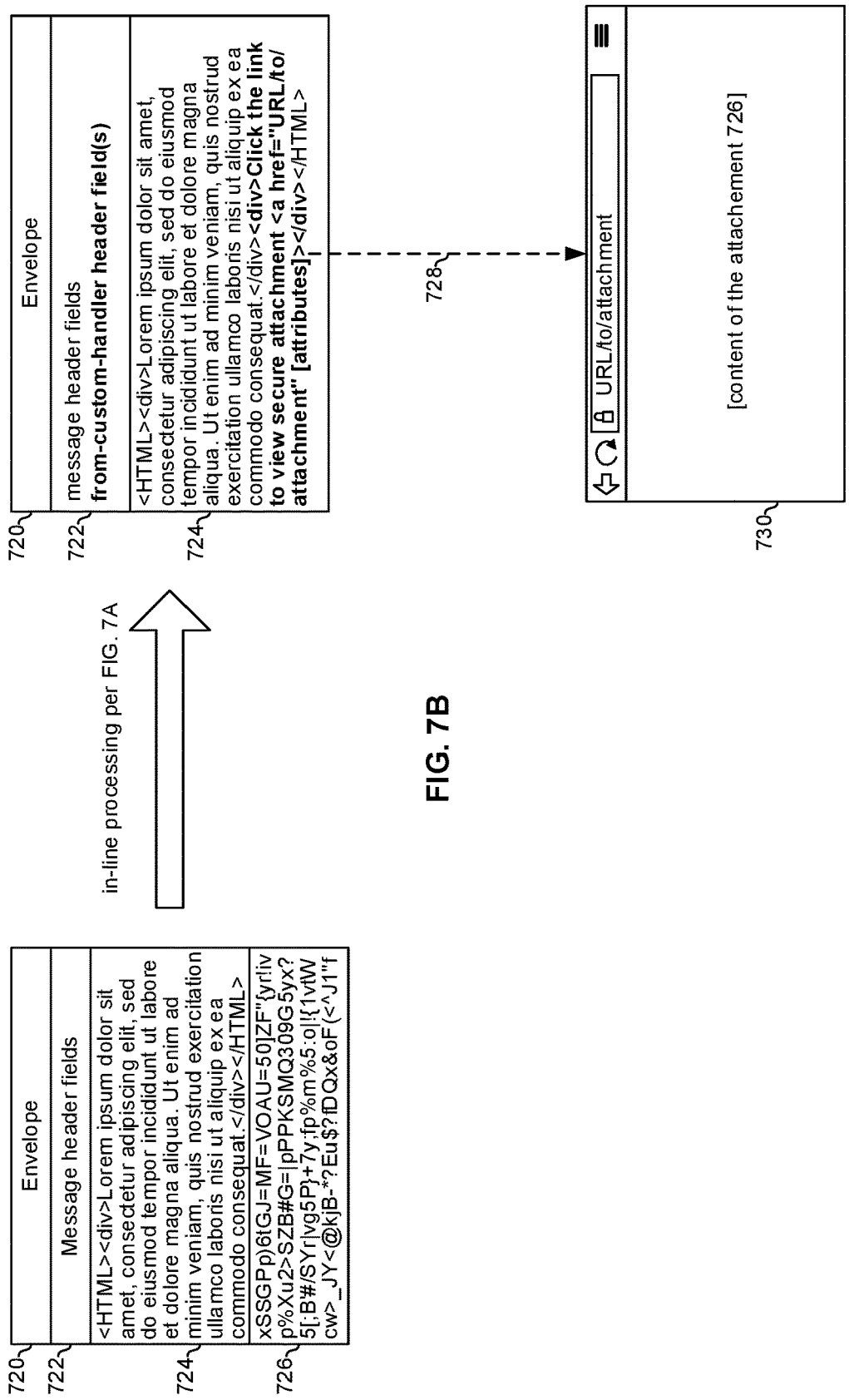
FIG. 7B illustrates an example implementation of the process of FIG. 7A in which an attachment to an email message is removed and a hyperlink to a securely hosted copy of the attachment is inserted into the body of the email message.

FIG. 7B illustrates an example implementation of the process of FIG. 7A in which an attachment to an email message is removed and a hyperlink to a securely hosted copy of the attachment is inserted into the content of the email message. As shown, prior to in-line processing according to the process of FIG. 7A, the message comprises envelope 720, header fields 722, body 724, and attachment 736. After in-line processing according to the process of FIG. 7A, the attachment 726 has been removed and replaced by a hyperlink. As represented by the dashed line 728, the hyperlink points to the attachment 726 accessible via web server circuitry 122. When clicked by the user, a browser 730 may open and display the content of the attachment 726. As indicated by the lock in the address bar of browser 730, the URL may be a secure URL (e.g., accessible only via https) and the person attempting to view the content may need to provide a previously generated username and password, may need to enter a one-time and/or time-sensitive password sent to the email address to which the message was intended, and/or some other suitable security measure.

Figure 7C:
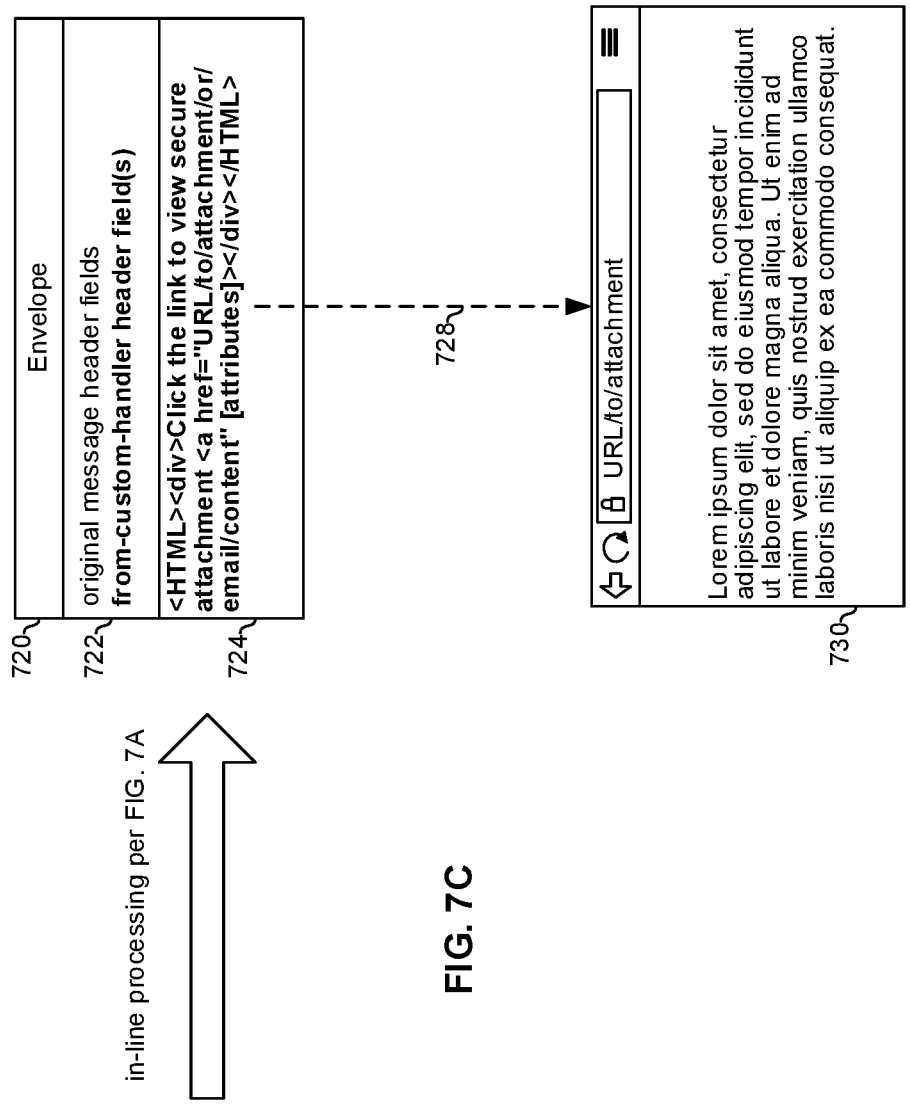
FIG. 7C illustrates an example implementation of the process of FIG. 7A in which plain text formatted content of an email message is removed and a hyperlink to a securely hosted copy of the plain text content is inserted into the content of the email message.
Figure 7C:
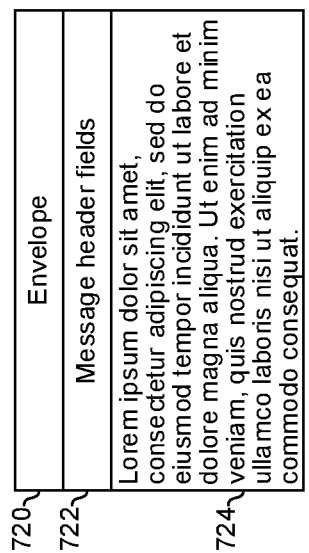

FIG. 7C illustrates an example implementation of the process of FIG. 7A in which plain text formatted content of an email message is removed and a hyperlink to a securely hosted copy of the plain text content is inserted into the content of the email message. As shown, prior to in-line processing according to the process of FIG. 7A, the message comprises envelope 720, header fields 722, and body 724 containing plan text content. After in-line processing according to the process of FIG. 7A, the plain text content of body 724 has been replaced by a hyperlink. As represented by the dashed line 728, the hyperlink points to the plain text content accessible via web server circuitry 122. When clicked by the user, a browser 730 may open and display the text. As indicated by the lock in the address bar of browser 730, the URL may be a secure URL (e.g., accessible only via https) and the person attempting to view the content may need to provide a previously generated username and password, may need to enter a one-time and/or time-sensitive password sent to the email address to which the message was intended, and/or some other suitable security measure. In another example implementation, the content may be converted to an image file (e.g., .gif, .jpeg. etc.) or video file (e.g., .mov, . flv, etc.) or audio file (e.g., .mp3, using text-to-speech), and then insert an HTML element (<img>, <video>, <audio> etc.) that the MUA can download and display natively without the user having to click a link and open a browser. In an example implementation, a database record of each email recipient may be accessed to see the type of device they typically use to view their email messages (e.g., desktop, tablet, or smartphone) and the image may be size appropriately based on that. Similarly, multiple images of different sizes corresponding to the recipients' various devices may be generated and hosted by the web server. The email message may then have links indicating which link to use depending on which device s/he is reading the email message on.

Similar to FIGS. 7B and 7C, HTML content (rather than plain text) may be hosted and replaced by a hyperlink. Also, the entire body need not be replaced. It may be that only sensitive text, images, etc. (e.g., containing information protected by HIPAA, social security numbers, and/or the like) are replaced by hyperlinks. In this regard, the process of FIG. 7A may be triggered by learning algorithms detecting information that is potentially sensitive.

Figure 7D:
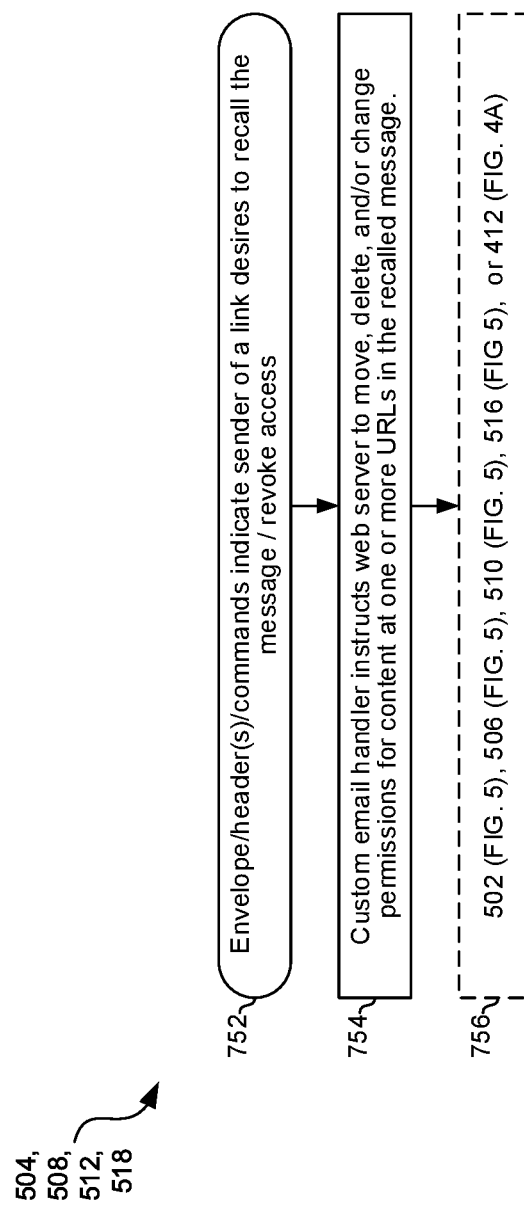
FIG. 7D is a flowchart illustrating an example implementation in which one of the blocks of FIG. 5A calls for the custom email handler to revoke access to the content stored at a the target of a hyperlink sent in a previous email message.

FIG. 7D is a flowchart illustrating an example implementation of one of the blocks 504, 508, 512, 518 of FIG. 5. In block 752, a rule associated with the envelope, header field(s), and/or message body of the email message indicates to the custom email handler 116 that a sender of an email message, such as the email messages of FIGS. 7B and 7C, desires to recall the message. In block 754, the custom email handler 116 instructs the web server circuitry 122 to move, delete, and/or change permissions for the content associated with one or more URLs in the recalled message.

Figure 7E:
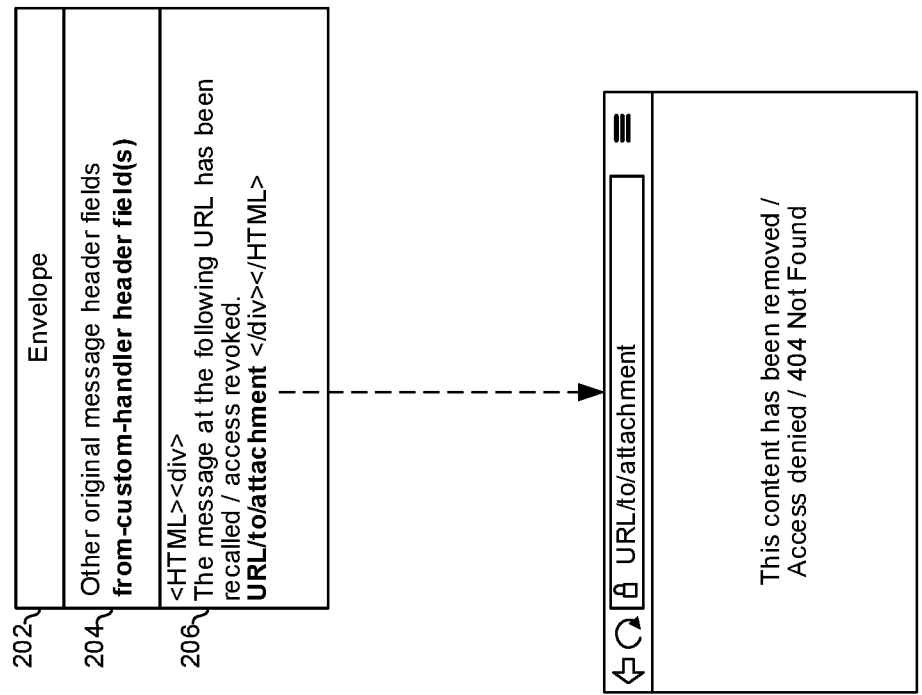
FIG. 7E illustrates an example implementations of the process of FIG. 7D.
Figure 7E:
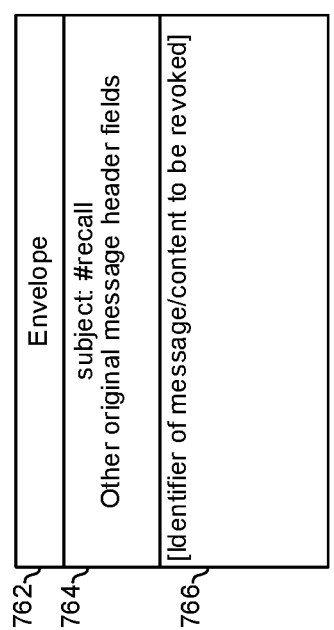

FIG. 7E illustrates an example implementations of the process of FIG. 7D. FIG. 7E shows a later message ("Recall message") attempting to recall an earlier message ("to-be-recalled message") Prior to the recall message being processed according to FIG. 7D, it comprises envelope 762, header fields 764, and body 766. In the example implementation, the custom email handler 116 is triggered to perform the process of FIG. 7D by the presence of the custom processing command "#recall" in the subject header field of the recall message. The custom handler may identify the to-be-recalled message based on one or more fields of the recall message's envelope, one or more of the recall message's header fields, and/or the recall message's body. For example, the recall message may be a forward or reply to the to-be-recalled message, and the custom email handler may identify the to-be-recalled message based on a "reply-to" header field of the recall message matching a header of the to-be-recalled message, based on similarity between the subject header fields of the two messages, based on a message-id header field in the recall message matching a message-id of the to-be-recalled message, and/or the like. After processing according to FIG. 7D, the recall message comprises a message informing the recipients that access to the URL has been revoked, changed, etc. The recall message may be sent to one or more recipients of the to-be-recalled message. For example, the recall message may be destined to only a subset of the recipients of the to-be-recalled message; access may be revoked/changes/etc. for only that subset of recipients, and only that subset of recipients may receive the message notifying them of the change. Additionally, or alternatively, the recall message may be sent back to the original sender (e.g., the custom email handler may automatically bcc: the original sender during processing according to FIG. 10A) in order to confirm to the sender that his/her recall message has been received and the corresponding custom processing has been carried out.

FIG. 8A is a flowchart illustrating an example implementation of one of the blocks 504, 508, 512, 518 of FIG. 5. In block 802, a rule associated with the envelope, header field(s), and/or message body of the email message calls for the custom email handler 116 to replace any URLs found in the email message with corresponding notification URLs. In an example implementation, request a notification URL may be redirected by web server circuitry 122 to its corresponding original URL after web server circuitry 122 logs information about the request. In another example implementation, the web server circuitry 122 may download the content from the original URL, store it locally, and then serve the local copy in response to the request. In block 804, the message (e.g., in its entirety or specific portions such as its subject header field and message body) is parsed in search of HTML elements (e.g., <a>, <img>, <video>, etc.) which contain URLs. In block 806, for each of the URL(s) found during the search of the email message ("original URL(s)"), a corresponding notification email message is generated (e.g., based on the envelope, header field(s), custom processing commands, and/or original URL) and associated with the original URL in a database record of the custom email handler 116. The record may comprise other fields populated during in-line processing (e.g., the message's subject, its recipients, its sender, its content, etc.) and/or may comprise one or more fields (e.g., time of access, geographical location from which accessed, MUA or browser from which accessed, and/or the like) to be populated by the web server circuitry 122 upon receiving a request for the notification URL. In block 808, the original URLs are replaced with the notification URLs in the message.

Figure 8B:
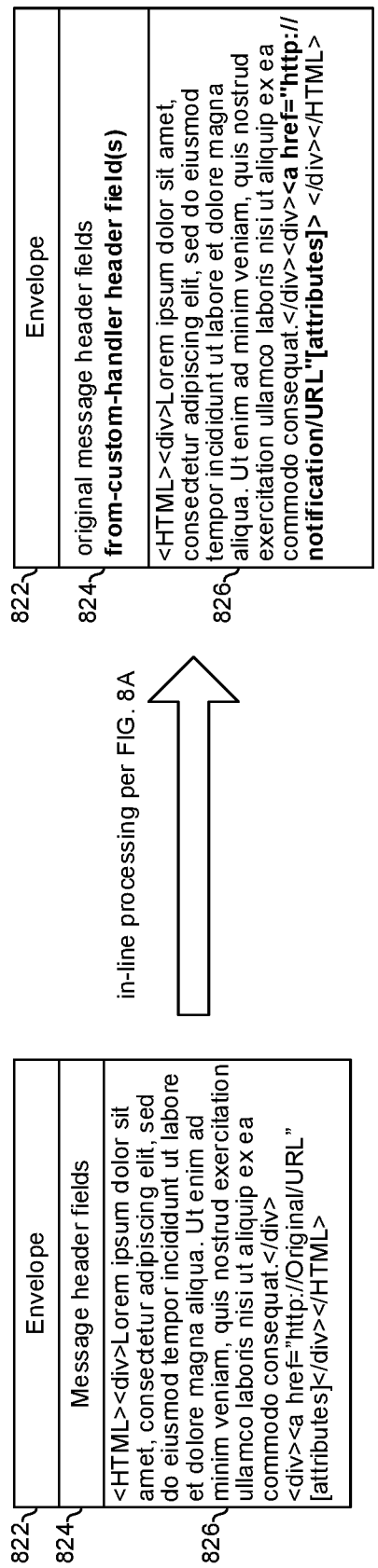
FIG. 8B illustrates an example implementation of the process of FIG. 5A.

FIG. 8B is a flowchart illustrating an example implementation of one or more of the blocks of FIG. 5. As shown, the message comprises an envelope 822, header fields 824, and body 826. Prior to in-line processing according to FIG. 8A, the body an <a> element having a URL of "http://Original.URL", after processing according to FIG. 8A, the URL of the <a> element has been replaced by "http://notification/URL."

Figure 9:
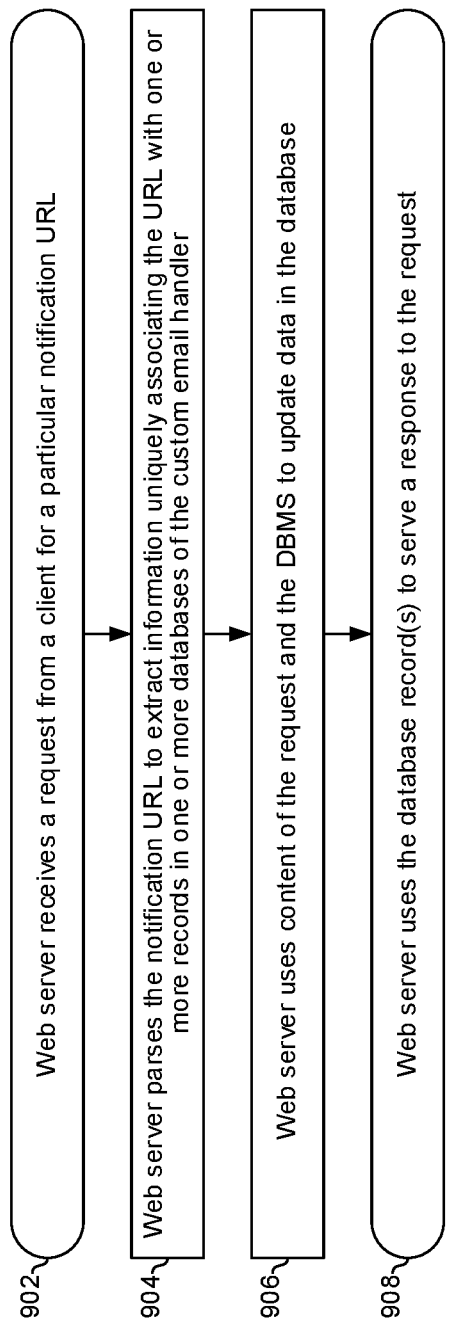
FIG. 9 is a flowchart illustrating an example process performed by a web server of the system of FIG. 1.

FIG. 9 is a flowchart illustrating an example process performed by a web server of the network of FIG. 1. The process of FIG. 9 may take place after a recipient of an email message processed by custom email handler 116 submits a request to web server circuitry 122 (e.g., upon opening the email message or actively selecting to download content of the email message and/or entering a URL present in the email message into a web browser). In block 902, web server circuitry 122 receives a request from a client device for a particular notification URL. In block 904, the web server circuitry 122 parses the notification URL to extract information uniquely associating the URL with one or more records in one or more databases of the custom email handler. In block 906, the web server updates one or more fields (e.g., time of access, geographical location from which accessed, number of times accessed, IP addresses from which accessed, MUA or browser from which accessed, and/or the like) of the one or more database records based on content of the request. In block 908, the web server circuitry 122 uses the database record(s) to serve a response to the client device. For example, the web server circuitry 122 may redirect the client device to a URL in the one or more database records. As another example, the web server circuitry 122 may send the client content identified by the one or more database records.

Figure 10A:
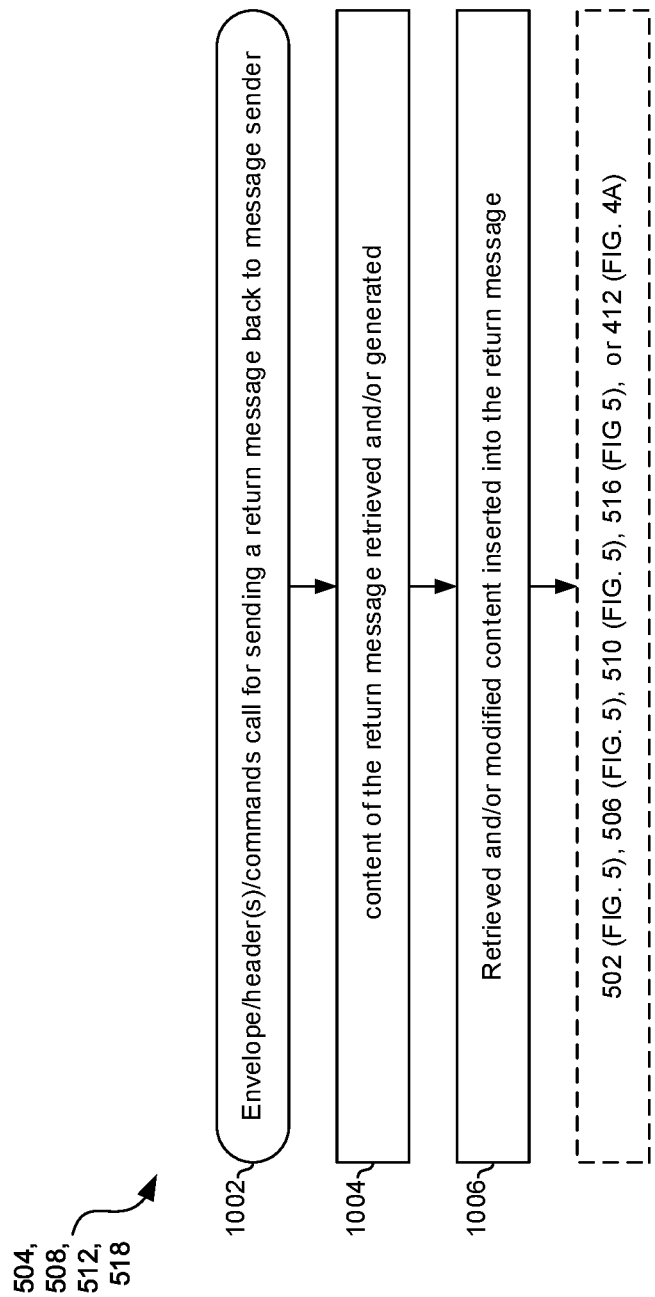
FIG. 10A is a flowchart illustrating an example implementation in which one of the blocks of FIG. 5A calls for sending an email message back to the sender of the email message received at the start of FIG. 4.

FIG. 10A is a flowchart illustrating an example implementation of one of the blocks 504, 508, 512, 518 of FIG. 5. In block 1002, a rule associated with the envelope, header field(s), and/or message body of the message calls for the custom email handler 116 to send a message ("return message") back to the sender of a received email message. In block 1004, the custom email handler 116 determines content to be included in the return message based on one or more fields of the inbound message's envelope, one or more of the inbound message's header fields, and/or the inbound message's body. This may comprise, for example, looking up a database record associated with the inbound message and retrieving content from the database record and/or executing one or more lines of code (e.g., a PHP script previously provided by the sender of the message and validated by the operator of the custom email handler 116) called for by the database record where output generated during the execution of the one or more lines of code is the content to be included in the return message. In block 1006, the content generated and/or retrieved in block 1104 is inserted into the body of the message.

Figure 10B:
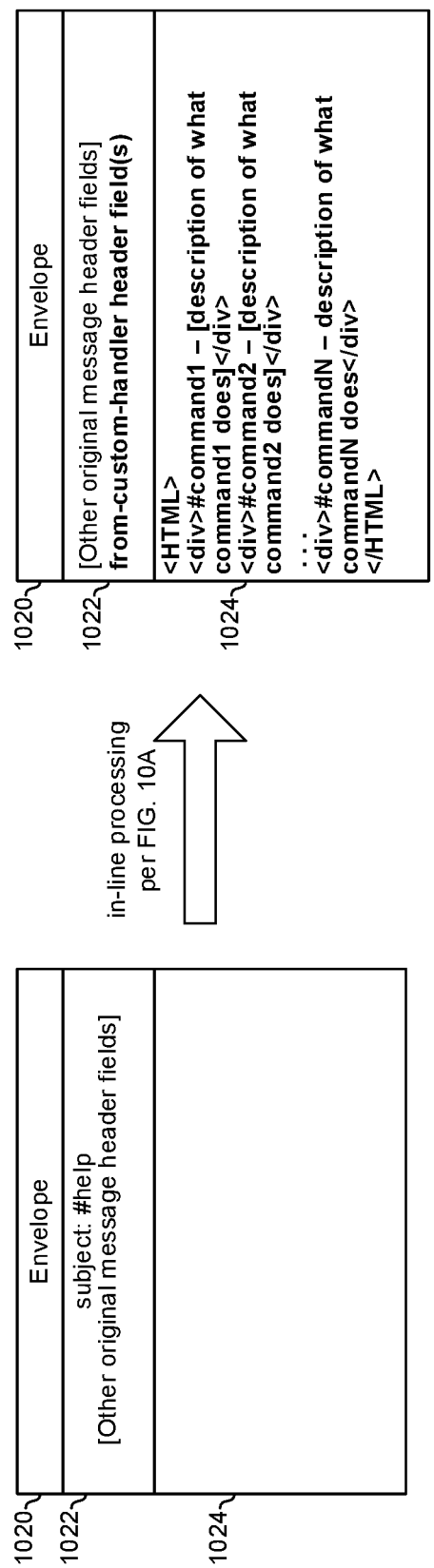
FIG. 10B illustrates an example implementation of the process of FIG. 10A in which content of the email message sent back to the sender provides information about custom processing commands available to the sender.

FIG. 10B illustrates an example implementations of the process of FIG. 10A in which content of the return message provides information about custom processing commands available to the sender. In this example, the message comprises a custom processing command "#help" (merely an example—other formats and/or text for the same command are of course possible) which causes a return message whose content (either an HTML-formatted document, plain text, or attachment) provides a listing of custom email processing commands available for the sender to use in his/her email messages. In this manner, the sender does not need to keep a copy of the available commands on his device or stored in his inbox, and has quick access to the list of commands even when using a temporary client device (e.g., when logged into webmail from a computer in a hotel lobby, from someone else's smartphone, etc.). Furthermore, the sender can be assured he has the list of latest commands which may be occasionally updated by a network administrator, etc.

Figure 10C:
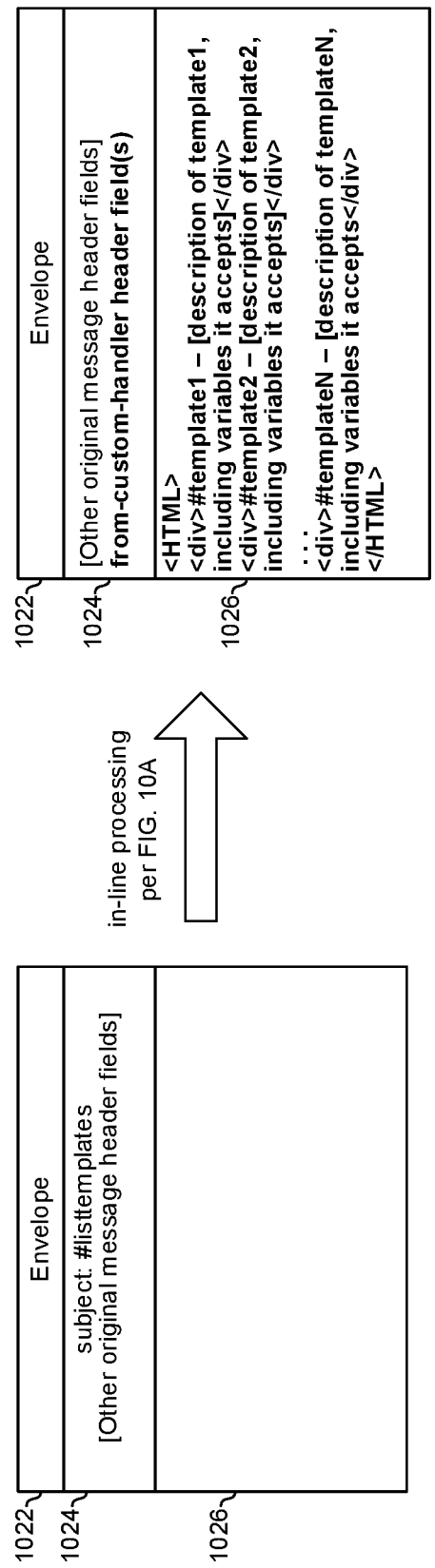
FIG. 10C illustrates an example implementation of the process of FIG. 10A in which content of the email message sent back to the sender provides a list of email message templates available to the sender.

FIG. 10C illustrates an example implementation of the process of FIG. 10A in which content of the return message provides a list of email message templates available to the sender. In this example, the message comprises a custom processing command "#listtemplates" (merely an example—other formats and/or text for the same command are of course possible) which causes a return message whose content (either an HTML-formatted document, plain text, or attachment) provides a listing of email message templates available for the sender to use in his/her email messages (example templates and use thereof is described below with reference to FIGS. 12A-12C). In this manner, the sender does not need to keep a copy of the templates on his device or stored in his inbox, and has quick access to them even when using a temporary client device (e.g., when logged into webmail from a computer in a hotel lobby, from someone else's smartphone, etc.). Furthermore, the sender can be assured he has the latest templates which may be occasionally changed by a network administrator, etc.

Figure 10D:
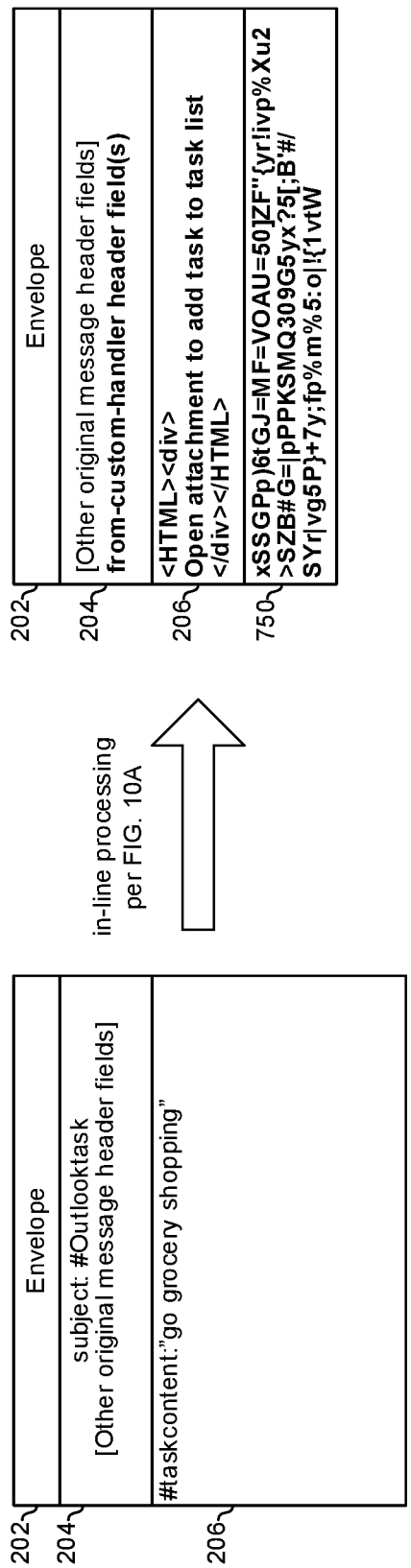
FIG. 10D illustrates an example implementation of the process of FIG. 10A in which content of the email message sent back to the sender is an attachment that triggers the addition of a task to a task list.

FIG. 10D illustrates an example implementation of the process of FIG. 10A in which content of the return message is an attachment that triggers an action by an application on the device from which the return email message is opened. In the example shown, the action is the addition of a task to a task list. That is, the sender sends an email message with the custom processing command #Outlooktask which triggers the process of FIG. 10A. During the process of 10A, the custom email handler 116 parses the email message for the #taskcontent command and uses that command generate the task file (e.g., a .pst file for Outlook) before being attached to the return message. Other examples besides a task list include calendar appointments, alarm settings, executables, and/or the like.

In another example implementation of the process of FIG. 10A, a custom processing command may request a file stored in storage 108, and the custom processing performed by the custom email handler 116 may comprise retrieving the file (e.g., indicated by a #filename custom processing command in the subject header field or message body), and attaching the file to the email message or providing a URL to the file. The URL may be a secure URL (e.g., accessible only via https) and the person attempting to view the content may need to provide a previously generated username and password, may need to enter a one-time and/or time-sensitive password sent to the email address to which the message was intended, and/or some other suitable security measure. Similarly, the URL may a one-time use such that, upon the first view the URL is disabled such that the hyperlink no longer points to the file.

Figure 10E:
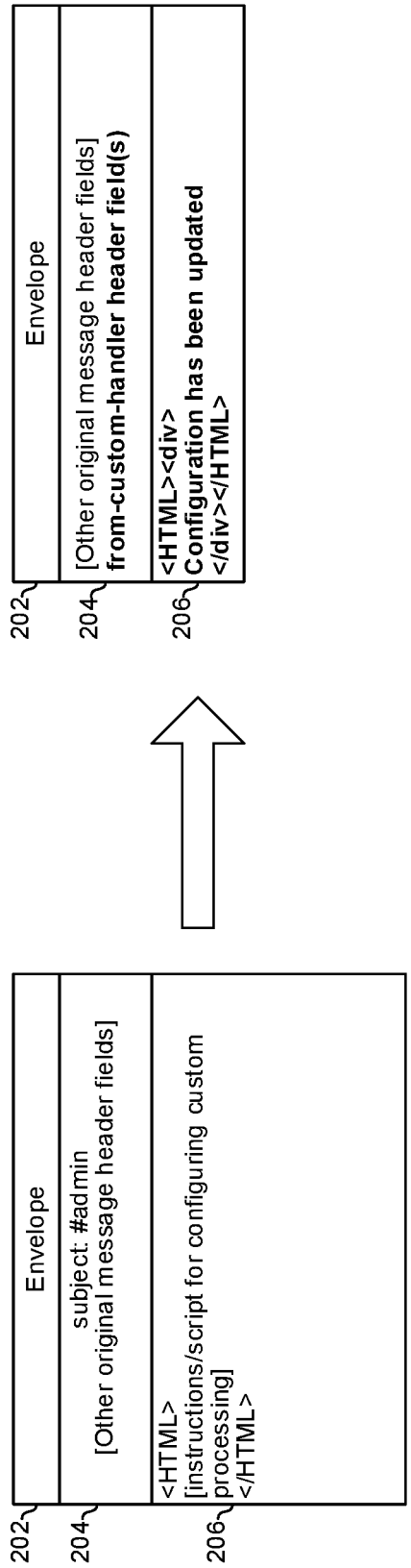
FIG. 10E illustrates an example implementation of the process of FIG. 10A in which a user can perform configuration/administration of the custom email handler via custom processing commands in an email message.

FIG. 10E illustrates an example implementation in which a user can perform configuration/administration of the custom email handler via custom processing commands in an email message. In the example shown, an "#admin" custom processing command triggers the custom email handler to execute one or more scripts for configuring the in-line email processing circuitry 118, the web server circuitry 122, the background email processing circuitry 120, and/or for storing data to and/or retrieving data from a database of the custom email handler 116. In an example implementation, the body of the email message may contain, or contain references to, the commands or scripts to be executed. For security, the custom email handler 116 may, for example, only accept the #admin command from particular senders and the commands or scripts to be executed may be encrypted. In an example implementation, such a command may be used to, for example, add a user (e.g., identified by email address) to a database of the custom email handler 116, configure the custom processing rules being applied for a particular user (or domain etc.) (e.g., temporarily suspend the application of one or more custom processing rules for a particular sender/recipient/etc.), run reports on usage of the custom email handler 116, obtain message notification statistics, and/or the like.

In another example implementation of FIG. 10A, a custom processing command may trigger execution of a script which posts content to a third part web site or service. For example, the custom processing command #post in the subject header field may trigger a post to a social network site, with content of the email message being the content of the post. The email message may then be modified to be a confirmation that the post has been submitted.

In another example implementation of FIG. 10A, a custom processing command may trigger execution of a script which causes a follow-up email message to be auto-generated if the original email message is not opened or replied-to in some determined amount of time (e.g., #followup1week may set the time to one week). The email message may then be modified to be a confirmation that the follow-up has been scheduled.

Figure 11:
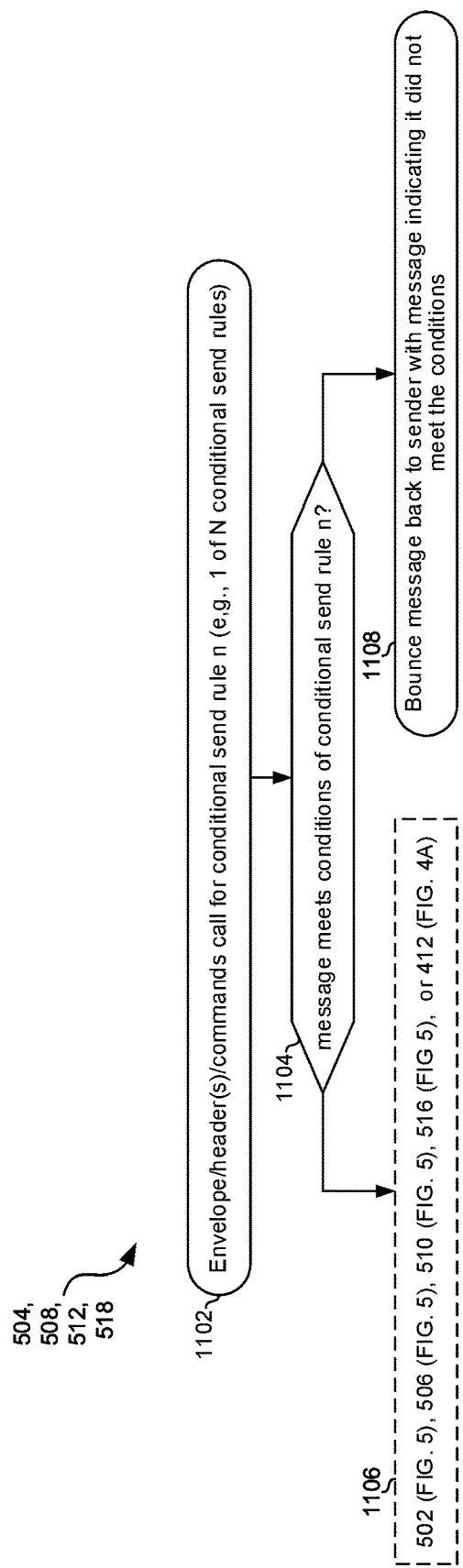
FIG. 11 is a flowchart illustrating an example implementation in which one of the blocks of FIG. 5A calls for the custom email handler to send (or bounce) a message only if one or more conditions associated with the email message are true (or not).

FIG. 11 is a flowchart illustrating an example implementation of one of the blocks 504, 508, 512, 518 of FIG. 5. In block 1102, a rule associated with the envelope, header field(s), and/or message body of the email message calls for the custom email handler 116 to send (or bounce) a message only if one or more conditions associated with the email message are true (or not). In block 1104, the message is parsed to determine whether it meets one or more conditions. Example conditions include: whether an intended recipient of the message has opened previous messages (from the sender and/or other senders such as coworkers) within a recent determined time period, whether an intended recipient of the message is known (or suspected) to be blocking notification objects, whether another account in sender's domain (e.g., coworker) has already sent a message to the intended recipient of the message, and/or the like.

FIG. 12 is a flowchart illustrating an example implementation of one of the blocks 504, 508, 512, 518 of FIG. 5. In block 1202, a rule associated with the envelope of an inbound message, header field(s) of the inbound message, and/or message body of the inbound message calls for the custom email handler 116 to generate content of a corresponding outbound message from a template. In block 1204, a template identified by the rule is retrieved from a database of the custom email handler 116. In block 1206, one or more placeholders in the template are replaced with custom content extracted from the inbound message (e.g., identified through substring and/or regular expression matching). In block 1208, the template with customized content is inserted into the body of the outbound message.

Figure 12A:
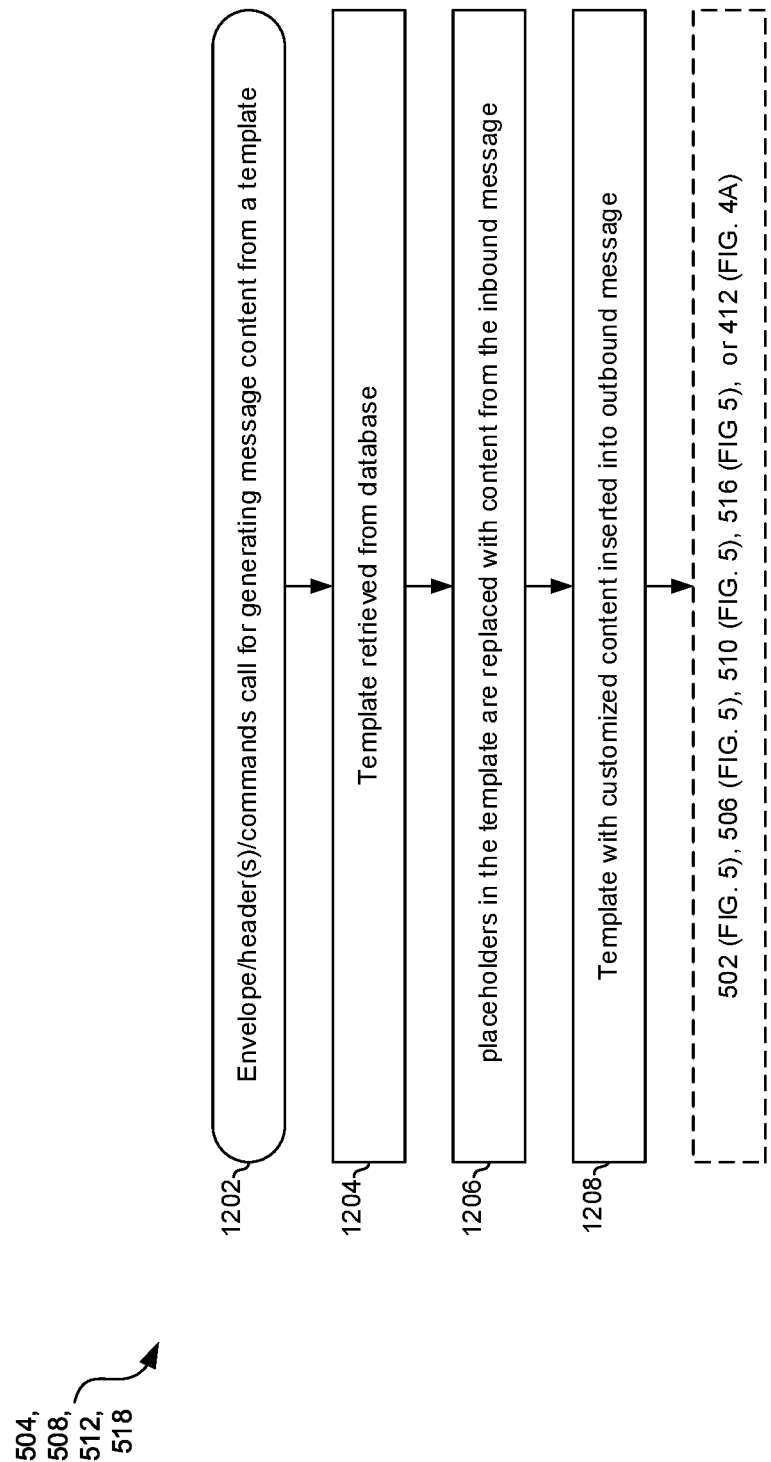
FIG. 12A is a flowchart illustrating an example implementation in which one of the blocks of FIG. 5A calls for generating content of an email message based on a template.

FIGS. 12B and 12C illustrate an example implementation of the process of FIG. 12A. FIG. 12B shows an example "template 1" having placeholders "#greeting", "#customtext", and "#closing". The template is stored to a database in custom email handler 116. FIG. 12C illustrates use of this template to generate an email message. As shown, the inbound message comprises the "#template1" custom processing command in its header fields and content for the "#greeting" "#customtext" and "closing" placeholders in its body. Processing per FIG. 12A results in the body 12C being populated with the contents of the template with the placeholders replaced with the text in the inbound message. In this manner, the sender has to type very little into the message (ideal if sending from a smartphone, for example) and the result is a lengthy, well-formatted email message according to a previously defined and approved template.

Figure 13A:
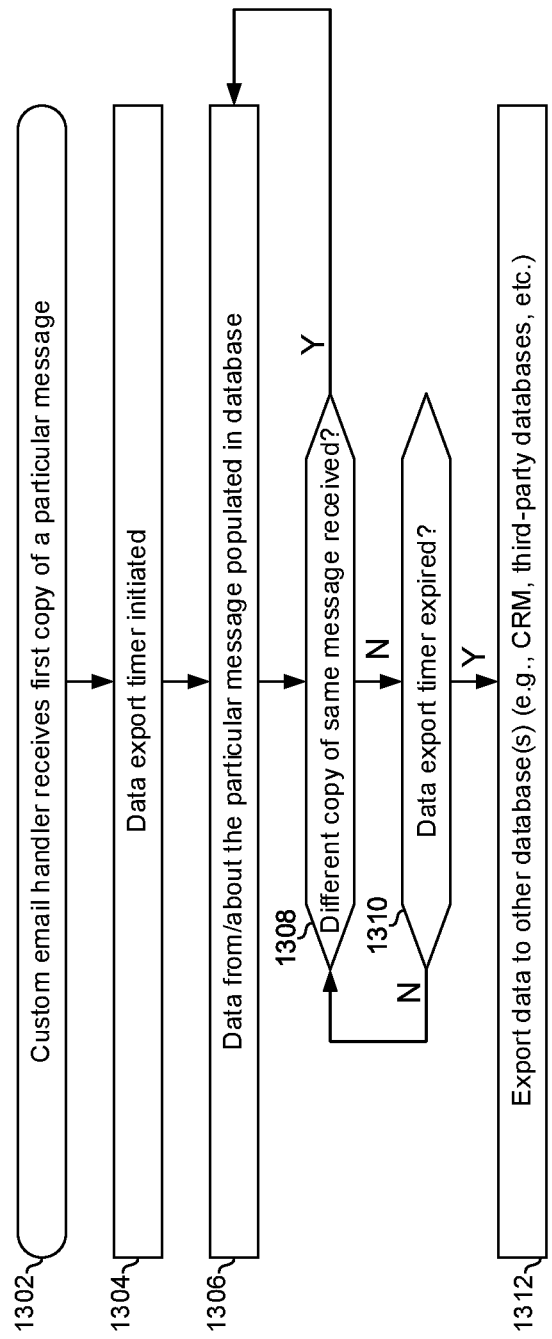
FIGS. 13A-13C illustrate handling of email messages with blind carbon copy recipients, in accordance with an example implementation of this disclosure.
Figure 13B:
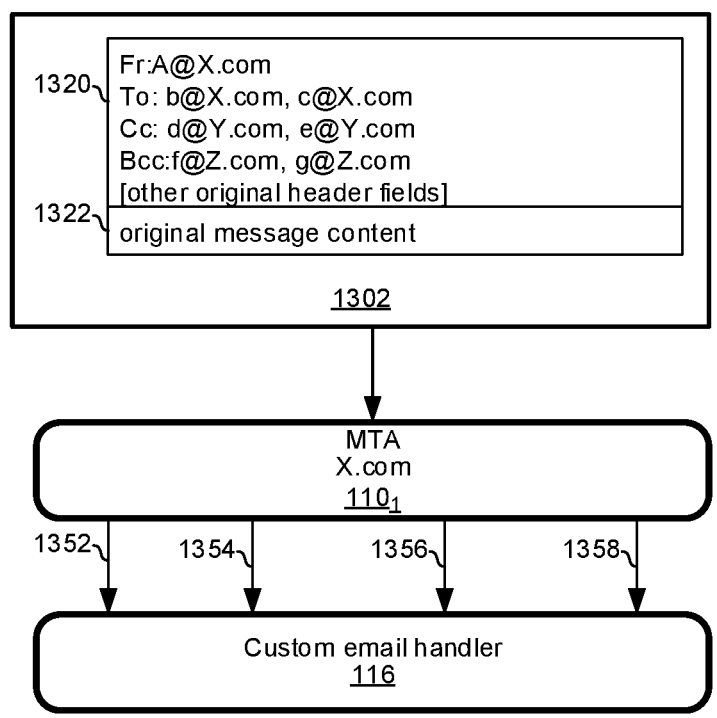
Figure 13C:
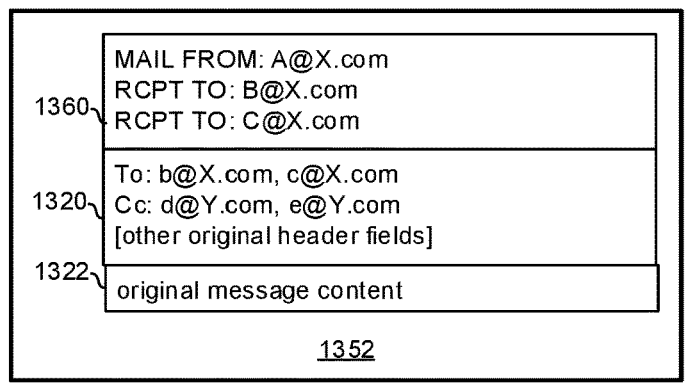
Figure 13C:
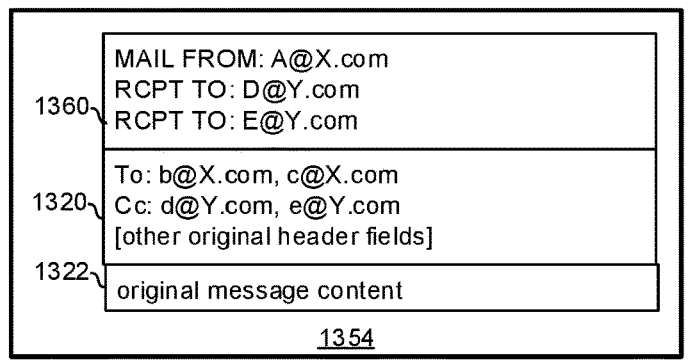
Figure 13C:
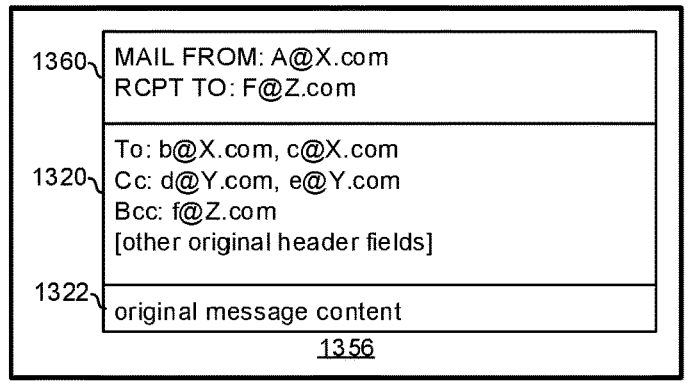
Figure 13C:
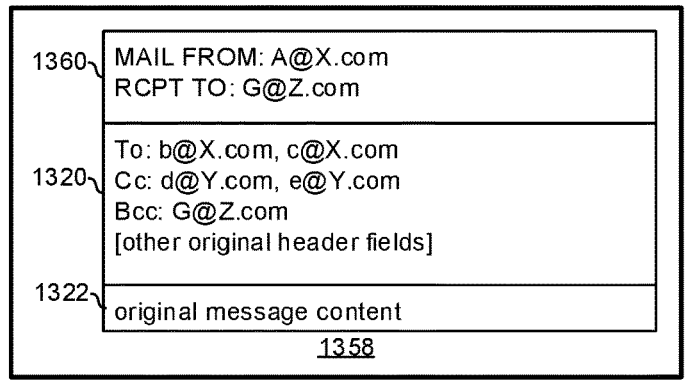

FIGS. 13A-13C illustrate handling of email messages with blind carbon copy recipients, in accordance with an example implementation of this disclosure. For email messages to multiple recipients (particularly if those recipients are at different domains), and for messages having bcc recipients, a sender MTA may send multiple copies of the same email message (e.g., one copy to each domain present in the list of recipients) to the custom email handler 116. Accordingly, the custom email handler 116 may receive multiple copies of the same email message, but with different envelopes. The process of FIG. 13A illustrates an example process for reconciling these multiple copies before exporting data about the email message to one or more third-party databases. In block 1302, the custom email handler 116 receives a first copy of a particular message. In block 1304, a data export timer starts counting. In block 1306, data extracted from and/or metadata generated about the particular message is stored to one or more records in one or more databases of the custom email handler 116. As show by blocks 1308 and 1310, the custom email handler 116 monitors for additional copies of the same particular message until the export timer reaches a predetermined time (e.g., 10 minutes). Each time another copy of the same particular message is received, the database records are updated (block 1306). When the timer expires, the process advances to block 1312 and the data and/or metadata stored in block 1306 is exported to one or more third party databases (e.g., a customer relationship management database of a company associated with the domain from which the particular message originated). In this manner, redundant exports of data and/or exports of incomplete data are reduced.

For example, referring to FIGS. 13B-13C, a message has the following recipients in its header fields 1320: to:B@X.com, C@X.com; cc:D@Y.com, E@Y.com; bcc: F@Z.com, G@Z.com. The sender MTA $110_1$ sends accordingly sends this to the custom email handler 116 four times. The first message 1352 is destined for "to:" and "cc:" recipients in domain Y.com, as shown in its envelope 1360. The second message 1354 is destined for "to:" and "cc:" recipients in domain Y.com, as shown in its envelope 1360. It should be noted that the headers of the messages 1352 and 1354 do not show the "bcc:" recipients (as is the point of the "bcc:" header). The second message contains the same information as the first message and thus there may be nothing to update in the database(s). The third message 1356 provides the additional information that the message 1302 was sent "bcc:" to F@Z.com. Similarly, the fourth email message 1358 provides the additional information of that message 1302 was sent "bcc:" to G@Z.com. After receiving all four of the messages, the custom email handler 116 knows all the recipients of the message 1302. Accordingly, if all four are received before the export timer expires, only one export to ant particular third-party database will be needed to ensure the third-party database has the full recipient information for message 1302.

FIG. 14A illustrates a third example flow of an email message through the network of FIG. 1. In FIG. 14A, MUA $114_1$ sends (represented by arrow 1402) an email message to sender MTA $110_1$. For purposes of illustration it is assumed the email message is from A@X.com to B@Y.com. MTA $110_1$ determines that the message is to be processed by custom email handler 116 (e.g., because the owner of X.com is a customer of the operator of the custom email handler and has instructed sender MTA $110_1$ to do as much). The message is thus sent (represented by arrow 1404) to custom email handler 116. The custom email handler 116 performs custom processing of the message for X.com and then sends it (represented by arrow 1406) to MTA $110_1$. MTA $110_1$ then sends (represented by arrow 1408) the message to MTA $110_2$. MTA $110_2$ determines that the message is to be processed by custom email handler 116 (e.g., because the owner of Y.com, is a customer of the operator of the custom email handler and has instructed MTA $110_1$ to do as much). The message is therefore sent (represented by arrow 1410) to custom email handler 116. The custom email handler 116 performs custom processing of the message for Y.com and then sends it (represented by arrow 1412) to MTA $110_2$. MTA $110_2$ then sends (represented by arrow 1414) the message to MUA $114_2$.

One nuance of the flow of FIG. 14A is that the custom email handler 116 must be able to distinguish the customer(s) for which it has already processed the message from the customer(s) for which it has not yet processed the message. Otherwise, upon receiving the message from MTA $110_2$, it may incorrectly determine the email message has already been processed and thus not perform the custom processing requested by Y.com. Furthermore, the custom email handler 116 must be able to distinguish between valid email messages sent by its customers and "spoofed" email messages. In the example implementation of FIG. 14B, this is achieved through header fields added by the MTAs and the custom email handler. As shown by messages 1404 and 1410 in FIG. 14B, when sending a message to the custom email handler 116, each MTA adds a header comprising its customerID and a security key. The customerID may, for example, be a unique string of characters fixed for each customer and the security key may, for example, be a unique string of characters that can be changed occasionally/periodically/etc. As shown by messages 1406, 1408, and 1412, once the custom email handler 116 completes custom processing of a message for a particular client, it adds a header field indicating as much.

In accordance with an example implementation of this disclosure, an email message is received, via network interface circuitry (e.g., 106) of a custom email handler (e.g., 116) using the simple mail transfer protocol (SMTP), after the email message has already visited a sender mail transfer agent (MTA) (e.g., $110_1$). The in-line email processing circuitry of the custom email handler searches a subject header field of the email message and/or a message body of the email message for one or more character strings matching any of a predefined set of custom email processing commands. The search may be triggered and performed automatically (without user intervention) based on predefined instructions/rules (e.g., based on finding the custom processing command in the email message). In response to finding one of the predefined set of custom email processing commands during the search, the in-line email processing circuitry modifies the message body of the email message in accordance with one or more rules associated with the one of the predefined set of custom email processing commands. The modifying may be triggered and performed automatically (without user intervention) based on predefined instructions/rules (e.g., based on finding the custom processing command in the email message). The in-line processing circuitry removes the one of the predefined set of custom email processing commands from the subject header field of the email message and/or the message body of the email message. The removal may be triggered and performed automatically (without user intervention) based on predefined instructions/rules (e.g., based on finding the custom processing command in the email message). After the modification of the message body and the removal of the found one of the custom processing commands, the email message is sent, via the network interface circuitry, into a network destined for a recipient mail transfer agent (e.g., $110_2$). The sending may be triggered and performed automatically (without user intervention) based on predefined instructions/ rules (e.g., based on finding the custom processing command in the email message).

In accordance with an example implementation of this disclosure, the custom email handler may comprise web server circuitry (e.g., 120), which may receive a request containing a URL previously inserted into an email message by the in-line processing circuitry. In response to the receiving the request, the custom email handler may determine whether to send a notification of the request to a sender of the email message (e.g., to A@X.com in the example of FIG. 2A) based on whether the email message contained a particular one of the predefined set of custom processing commands (e.g., whether it contained "#notify" or "#nonotify"). The determination of whether to send a request, and sending of the request (if determined to do so) may be triggered and performed automatically (without user intervention) based on predefined instructions/rules.

In accordance with an example implementation of this disclosure, the in-line email processing circuitry may generate a first uniform resource locator (URL) based on content of the email message. The in-line email processing circuitry may search for and detect, in the body of the message, a second uniform resource locator (URL) that one or both: contains a substring of a set of predefined substrings associated, in a database of the custom email handler, with the one of the predefined set of custom email processing commands; and matches a regular expression of a set of predefined regular expressions associated, in the database of the custom email handler, with the one of the predefined set of custom email processing commands. The modification of the message body of the email message may comprise replacing, in the body of the message, the second URL with the first URL. The generation of the first URL and the search may be triggered and performed automatically (without user intervention) based on predefined instructions/rules. Background processing circuitry of the custom email handler may download content pointed to by the first URL to storage of the custom email handler, wherein the first URL points to the downloaded content in storage of the custom email handler. The downloading may be triggered and performed automatically (without user intervention) based on predefined instructions/rules.

In accordance with an example implementation of this disclosure, the in-line email processing circuitry may search a subject header field of the email message and/or a message body of the email message for a character string containing one or more characters that indicates that the character string is for populating a placeholder in the message template. The searching may be triggered and performed automatically (without user intervention) based on predefined instructions/ rules.

In accordance with an example implementation of this disclosure, the in-line email processing circuitry may detect whether the email message comprises an attachment, and in response to the detecting that the email message comprises an attachment: store the attachment to storage of the custom email handler, and generate a uniform resource locator (URL) that points to the attachment stored in the storage of the custom email handler. The detection, storing, and generating may be triggered and performed automatically (without user intervention) based on predefined instructions/rules. The modifying the message body of the email message may comprise removing the attachment from the email message, and inserting a hypertext markup language (HTML) element containing the URL into the message body of the email message.

In accordance with an example implementation of this disclosure, the email message is associated with a uniform resource locator, and the in-line email processing circuitry may perform, in response to the finding of the one of the predefined custom processing commands, one or more of: altering accessibility of content associated with the URL; deleting the content associated with the URL; and associating the URL with content not previously associated with the URL. The altering, deleting, or associating may be triggered and performed automatically (without user intervention) based on predefined instructions/rules.

In accordance with an example implementation of this disclosure, the in-line email processing circuitry may retrieve from storage (e.g., 108) of the custom email handler, a file identified in the subject header field of the email message and/or the message body of the email message. The retrieving may be triggered and performed automatically (without user intervention) based on predefined instructions/ rules. The modifying the message body of the email message may comprises attaching the file to the email message.

In accordance with an example implementation of this disclosure, the in-line email processing circuitry may locate, in storage of the custom email handler, a file identified in the subject header field of the email message and/or the message body of the email message. The in-line email processing circuitry may generate a uniform resource locator (URL) that points to the file in the storage of the custom email handler. The locating of the file and generating of the URL may be triggered and performed automatically (without user intervention) based on predefined instructions/rules. The modifying the message body of the email message may comprises inserting, in the message body of the email message, a hypertext markup language (HTML) element containing the URL.

In accordance with an example implementation of this disclosure, the in-line email processing circuitry may, in response to the finding the one of the predefined set of custom email processing commands during the searching, add one or more message header fields to the email message, wherein the one or more message header fields indicate: the email message has been processed by the custom email handler, and an identifier of a sender for which the email message has been processed by the custom email handler. The adding of the header field(s) may be triggered and performed automatically (without user intervention) based on predefined instructions/rules As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems.

Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   receiving, by email processing circuitry of a mail transfer agent, an inbound email message from a mail user agent;
   detecting, by the email processing circuitry based on parsing of the envelope of the inbound email message, that the inbound email message:
   is intended for multiple recipients; and
   comprises one or both of:
      a header which determines that notification objects are to be embedded in corresponding output email messages; and
      body content which determines that notification objects to be embedded in the corresponding output email messages;
   generating, by the email processing circuitry, a plurality of unique notification objects;
   packaging, by the email processing circuitry, the inbound email message into the outbound email messages, wherein each of the outbound email messages is intended for only one of the multiple recipients and comprises a respective one of the notification objects.

2. The method of claim 1, wherein each of the notification objects comprises a respective one of a plurality of unique uniform resource locators (URLs).

3. The method of claim 1, wherein the message body of the inbound email message comprises a first URL and the method comprises:
   generating a plurality of second URLs, each of which is unique among the second URLs; and
   replacing, in each of the multiple outbound messages, the first URL with a respective one of a plurality of second URLs.

4. The method of claim 3, wherein each of the second URLs targets content hosted by a web server of the computing system.

5. The method of claim 1, wherein each of the notification objects is a hypertext markup language (HTML) element.

6. The method of claim 1, comprising sending, by network interface circuitry of the computing system, the multiple outbound email messages into a network using simple mail transfer protocol (SMTP).

7. A system comprising:
   email processing circuitry and networking circuitry of a mail transfer agent, wherein the email processing circuitry is configured to:
   receive, via the networking circuitry, an inbound email message from a mail user agent; and
   detect, based on a parse of the envelope of the inbound email message:
      that the inbound email message is intended for multiple recipients; and
      that the inbound email comprises one or both of:
         a header which determines that notification objects are to be embedded in corresponding output email messages; and
         body content which determines that notification objects to be embedded in the corresponding output email messages;
   generate a plurality of unique notification objects;
   package the inbound email message into the outbound email messages, wherein each of the outbound email messages is intended for only one of the multiple recipients and comprises a respective one of the notification objects.

8. The system of claim 7, wherein each of the notification objects comprises a respective one of a plurality of unique uniform resource locators (URLs).

9. The system of claim 7, wherein the message body of the inbound email message comprises a first URL and the email processing circuitry is configured to:
   generate a plurality of second URLs, each of which is unique among the second URLs; and
   replace, in each of the multiple outbound messages, the first URL with a respective one of a plurality of second URLs.

10. The system of claim 9, wherein each of the second URLs targets content hosted by a web server of the computing system.

11. The system of claim 7, wherein each of the notification objects is a hypertext markup language (HTML) element.

12. The system of claim 7, comprising network interface circuitry operable to send the multiple outbound email messages into a network using simple mail transfer protocol (SMTP).

13. A computer readable medium having stored thereon one or more lines of code executable by a computer to configure the computer such that it comprises email processing circuitry and networking circuitry of a mail transfer agent, wherein the email processing circuitry is configured to:
   receive, via the networking circuitry, an inbound email message from a mail user agent; and
   detect, based on a parse of the envelope of the inbound email message:
      that the inbound email message is intended for multiple recipients; and
      that the inbound email comprises one or both of:
         a header which determines that notification objects are to be embedded in corresponding output email messages; and
         body content which determines that notification objects to be embedded in the corresponding output email messages;

generate a plurality of unique notification objects;

package the inbound email message into the outbound email messages, wherein each of the outbound email messages is intended for only one of the multiple recipients and comprises a respective one of the notification objects.

14. The computer readable medium of claim 13, wherein each of the notification objects comprises a respective one of a plurality of unique uniform resource locators (URLs).

15. The computer readable medium of claim 13, wherein the message body of the inbound email message comprises a first URL and the email processing circuitry is configured to:

generate a plurality of second URLs, each of which is unique among the second URLs; and replace, in each of the multiple outbound messages, the first URL with a respective one of a plurality of second URLs.

16. The computer readable medium of claim 15, wherein each of the second URLs targets content hosted by a web server of the computing system.

17. The computer readable medium of claim 16, wherein each of the notification objects is a hypertext markup language (HTML) element.

18. The system of claim 16, comprising network interface circuitry operable to send the multiple outbound email messages into a network using simple mail transfer protocol (SMTP).

* * * * *